US012643466B2

(12) United States Patent
Thompson

(10) Patent No.: US 12,643,466 B2
(45) Date of Patent: Jun. 2, 2026

(54) SCHOOL BUS SAFETY DEVICES AND SYSTEMS

(71) Applicant: Bus Gates Inc., Rochester, IL (US)

(72) Inventor: Daniel F. Thompson, Rochester, IL (US)

(73) Assignee: Bus Gates Inc., Rochester, IL (US)

( * ) Notice: Subject to any disclaimer, the term of this patent is extended or adjusted under 35 U.S.C. 154(b) by 0 days.

(21) Appl. No.: 19/260,124

(22) Filed: Jul. 3, 2025

(65) Prior Publication Data

US 2025/0332991 A1 Oct. 30, 2025

Related U.S. Application Data

(63) Continuation-in-part of application No. 18/661,621, filed on May 11, 2024, which is a continuation-in-part of application No. 18/203,019, filed on May 29, 2023, now Pat. No. 12,377,774.

(60) Provisional application No. 63/783,228, filed on Apr. 4, 2025, provisional application No. 63/349,083, filed on Jun. 4, 2022.

(51) Int. Cl.
*B60Q 1/50* (2006.01)
*B60Q 1/26* (2006.01)

(52) U.S. Cl.
CPC ........... *B60Q 1/547* (2022.05); *B60Q 1/2692* (2013.01); *B60Q 1/2696* (2013.01); *B60Q 1/503* (2013.01)

(58) Field of Classification Search
CPC ...... B60R 2021/0067; B60R 2021/346; B60R 21/34; G09F 13/0472
See application file for complete search history.

(56) References Cited

U.S. PATENT DOCUMENTS

| | | | |
|---|---|---|---|
| 1,864,018 A * | 6/1932 | Hicks | B60Q 1/543 |
| | | | 116/52 |
| 4,430,638 A | 2/1984 | Parker | |
| 4,825,192 A | 4/1989 | Wells | |
| 5,249,381 A | 10/1993 | Panossian | |
| 5,281,948 A | 1/1994 | Estrada | |
| 5,796,331 A | 8/1998 | Lamparter | |
| 6,009,650 A | 1/2000 | Lamparter | |
| 6,213,047 B1 | 4/2001 | Means et al. | |
| 6,234,105 B1 | 5/2001 | Lamparter | |
| 6,738,089 B1 | 5/2004 | Silc | |
| 7,034,667 B2 | 4/2006 | Redfield | |
| 9,245,465 B1 | 1/2016 | Geyer et al. | |

(Continued)

OTHER PUBLICATIONS

International Search Report and Written Opinion received in Patent Cooperation Treaty Application No. PCT/US2023/023793, ISA/US, dated Oct. 11, 2023, 13 pages.

(Continued)

*Primary Examiner* — Shin H Kim
(74) *Attorney, Agent, or Firm* — Johnston IP Law, PLLC

(57) ABSTRACT

In one instance, a safety device is mounted to an exterior side of a school bus. The safety device includes a mounting bracket configured for coupling to a mounting motor, with the mounting bracket being moveable between a undeployed position and a deployed position by the mounting motor. An arm portion is coupled to the mounting bracket. The arm portion has a proximal end and a distal end, with the proximal end being coupled to the mounting bracket. The safety device further includes a plurality of lights coupled to the arm portion.

20 Claims, 32 Drawing Sheets

(56)                    References Cited

U.S. PATENT DOCUMENTS

| 11,479,166 | B2  | 10/2022 | Ringer et al. | |
|---|---|---|---|---|
| 11,607,991 | B2 * | 3/2023 | Torres | B60Q 1/544 |
| 12,377,774 | B2 * | 8/2025 | Thompson | B60Q 1/0052 |
| 2003/0070603 | A1 | 4/2003 | Vandermolen et al. | |
| 2007/0252538 | A1 | 11/2007 | Swanger | |
| 2008/0157945 | A1 | 7/2008 | Bowler | |
| 2012/0177336 | A1 | 7/2012 | Bhan | |
| 2013/0112835 | A1 | 5/2013 | Buley et al. | |
| 2018/0112366 | A1 | 4/2018 | Young, Jr. | |
| 2021/0002835 | A1 | 1/2021 | Adler et al. | |
| 2021/0221283 | A1 | 7/2021 | Yudelevich et al. | |
| 2022/0009410 | A1 | 1/2022 | Torres et al. | |
| 2022/0332243 | A1 | 10/2022 | Mcgirt et al. | |
| 2023/0391251 | A1 * | 12/2023 | Thompson | B60Q 1/2696 |
| 2024/0295091 | A1 * | 9/2024 | Thompson | B60Q 1/2692 |
| 2025/0332991 | A1 * | 10/2025 | Thompson | G09F 21/04 |

OTHER PUBLICATIONS

Solidworks Tech Blog, "Topology Studies for Pocketing Parts", https://web.archive.org/web/20220122195257/https://blogs.solidworks.com/tech/2019/03/topology-studies-for-pocketing-parts.html, Mar. 15, 2019.
The Manufacturer, "Optimising Nesting & Fabrication", https://www.themanufacturer.com/articles/optimising-nesting-fabrication/, Jul. 9, 2021.

* cited by examiner

SCHOOL BUS SAFETY DEVICES AND SYSTEMS

CROSS-REFERENCE TO RELATED APPLICATION

This application is a continuation-in part application of U.S. application Ser. No. 18/661,621, filed by Daniel F. Thompson, on May 11, 2024, entitled "School Bus Safety Devices and Systems," which is a continuation-in-part application of U.S. application Ser. No. 18/203,019, filed by Daniel F. Thompson, on May 29, 2023, entitled "School Bus Safety Devices and Systems," which claims the benefit of U.S. Provisional Application Ser. No. 63/349,083, filed by Daniel F. Thompson, on Jun. 4, 2022, entitled "School Bus Safety Devices and Systems," and this application also claims the benefit of U.S. Provisional Application 63/783, 228, filed by Daniel F. Thompson, on Apr. 4, 2025, entitled "School Bus Safety Devices and Systems," all of which are incorporated herein by reference in their entirety for all purposes.

TECHNICAL FIELD

This application is directed, in general, to safety, and more specifically, to school bus safety devices and systems.

BACKGROUND

There are thousands and thousands of school buses in the world used to transport children of varying ages to school. At times, a child entering or exiting a school bus will go around the front of the bus and across traffic without sufficient care to look carefully before crossing. Moreover, at times, cars behind a school bus impatiently accelerate to pass the school bus that is loading or off-loading children. This can present dangerous situations for children, and it is desirable to do everything possible to keep children safe. Improvements in safety devices for buses are desired.

DESCRIPTION OF THE DRAWINGS

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

Figure 1:
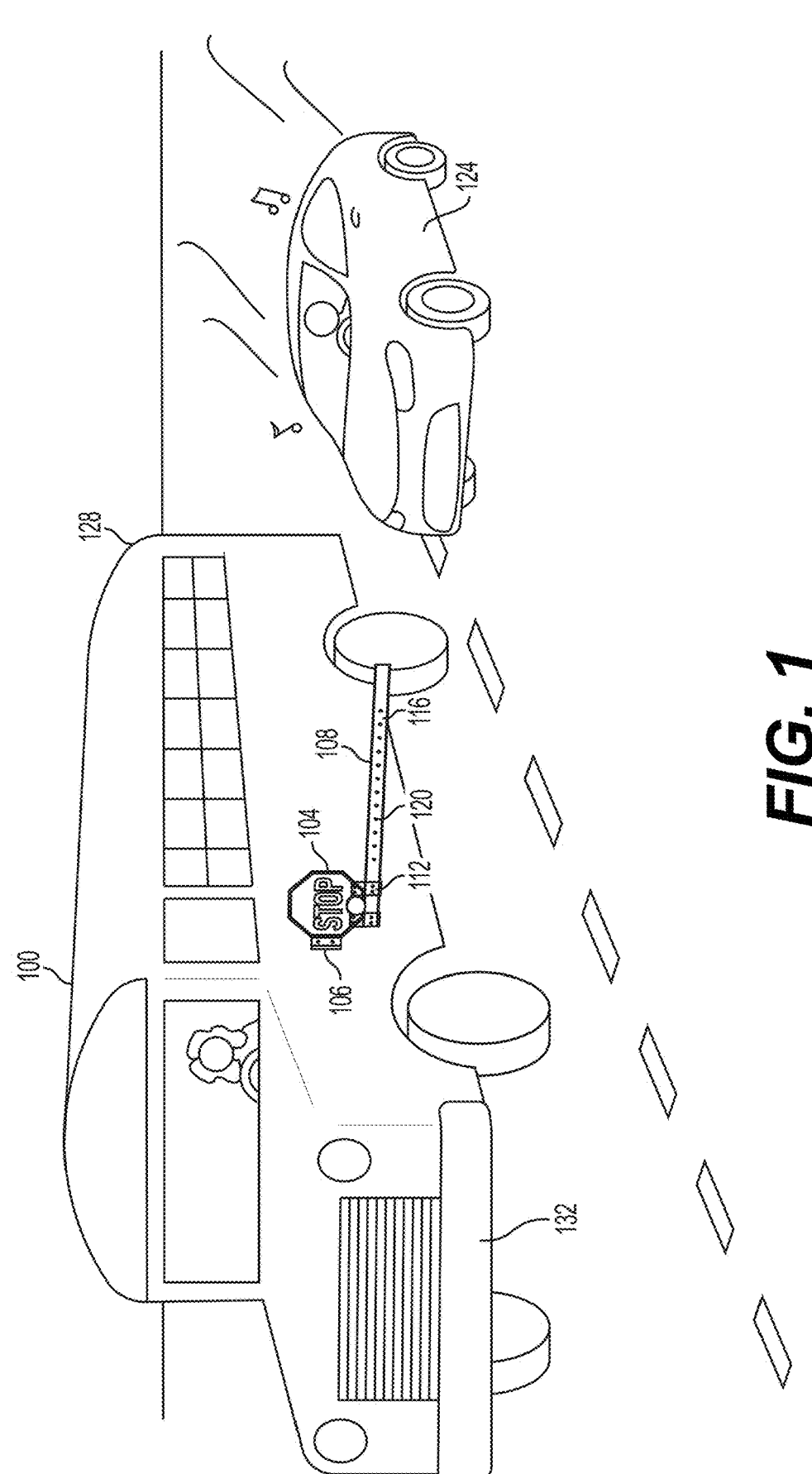
FIG. 1 is a schematic diagram of a bus having a safety device mounted to a pivotable STOP sign.

Referring to the figures and initially to FIG. 1, a school bus 100 is shown in a disembarking or an unloading mode. A pivotable STOP sign 104 is pivotably mounted to the bus 100 on a motor-driven pivotable mount 106 and is shown in the extended (or deployed) position and has a safety device 108. A portion of the safety device 108 extends towards or into a lane of traffic adjacent to the bus. The safety device 108 includes a bracket 112 and an arm 116, or extension. The arm 116 may include a plurality of lights 120, such as LED lights. The safety device 108 extends to warn any vehicles, such as a car 124, which may be approaching from the rear 128 of the school bus 100. This warning is important because children exiting the school bus who are going to the opposite side of the street will walk around to the front 132 of the school bus 100.

Figure 2:
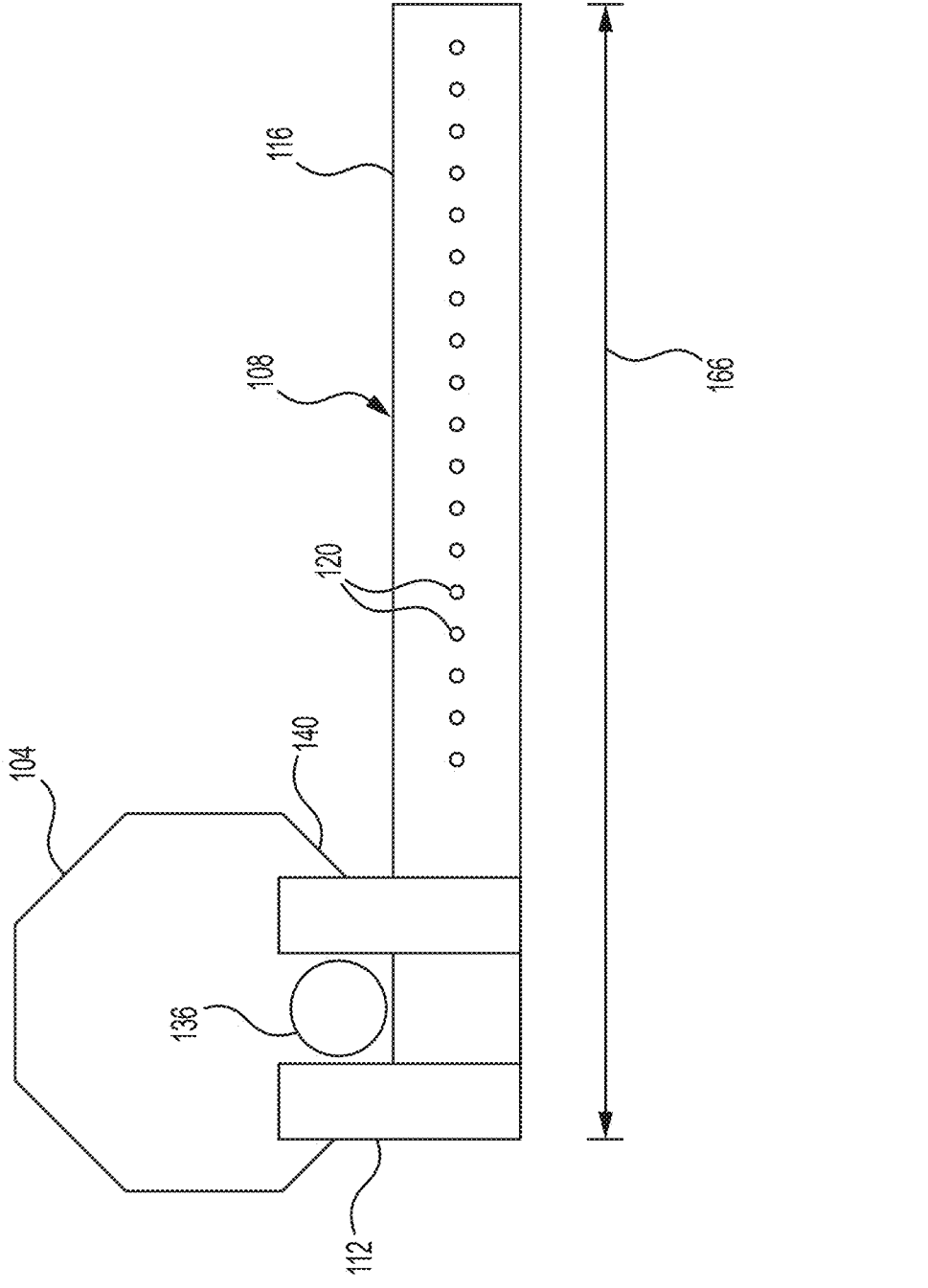
FIG. 2 is an illustrative embodiment for mounting to a STOP sign having a bracket and an arm.
Figure 3:
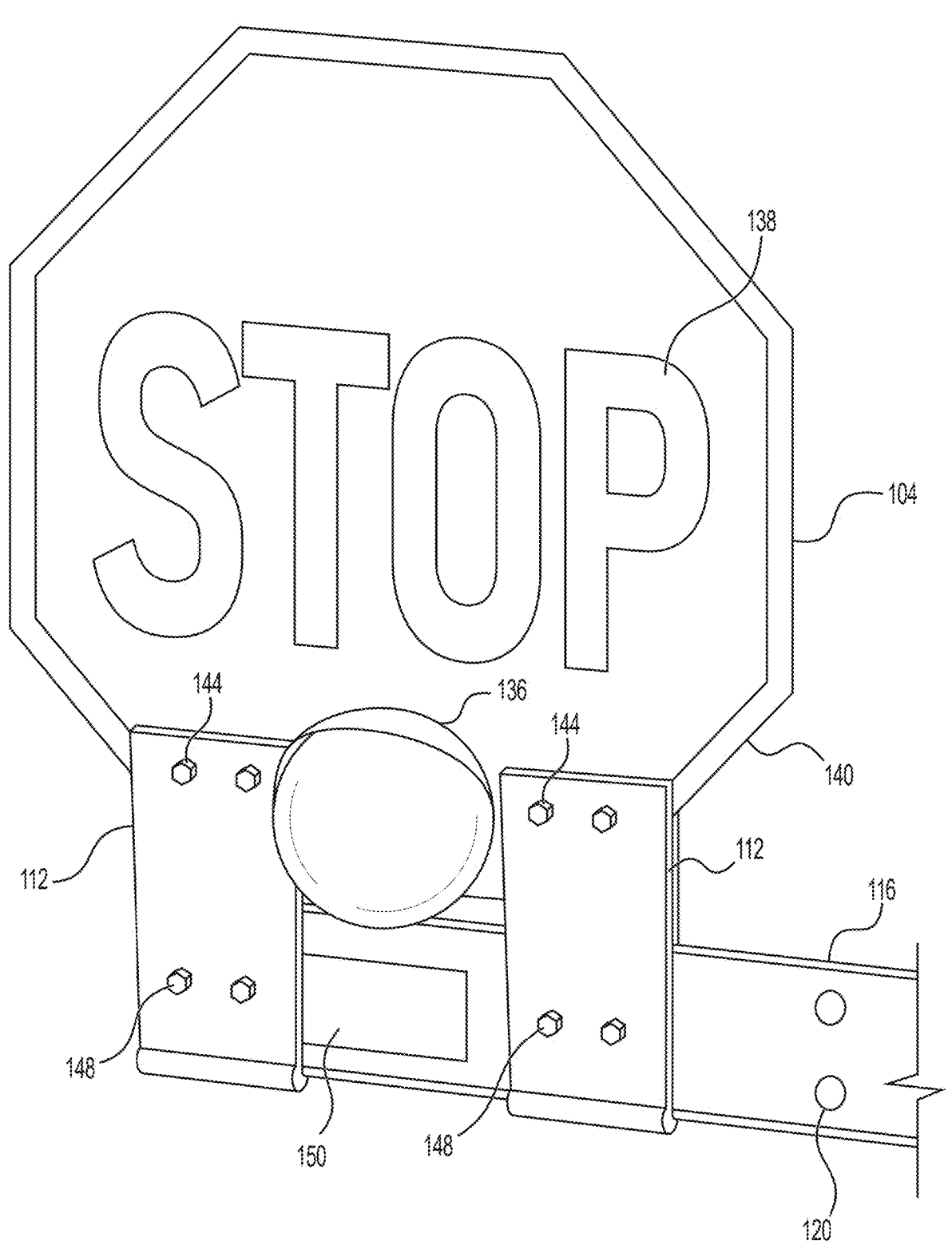
FIG. 3 is a schematic perspective view of an illustrative embodiment of a pivotable STOP sign to which a safety device has been coupled.
Figure 4:
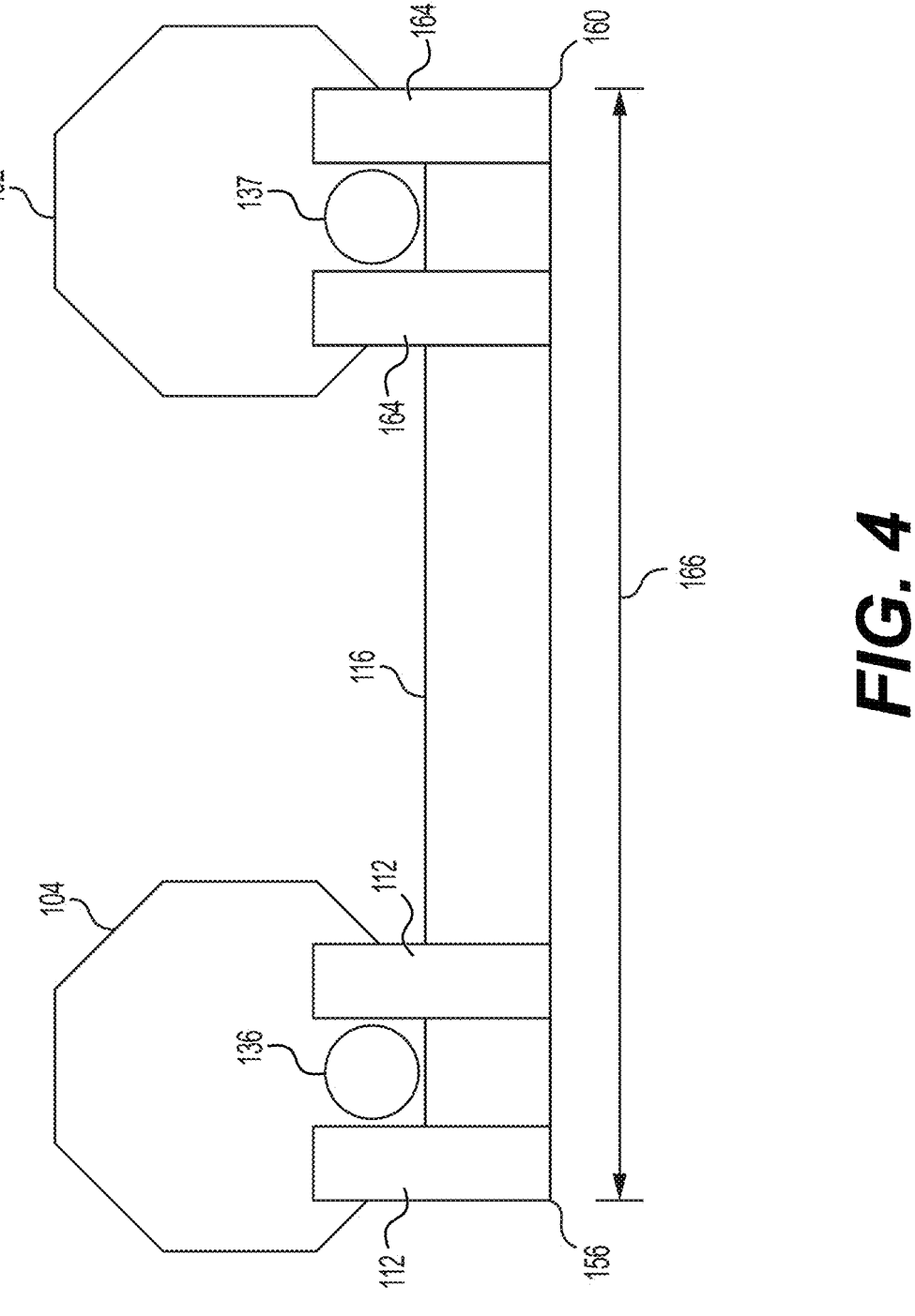
FIG. 4 is an illustrative embodiment of a safety device for coupling to a pivotable STOP sign and having a second STOP sign on a distal end.

Referring now primarily to FIGS. 2 and 3, the illustrative embodiment of the safety device 108 is shown in more detail. The pivotal STOP sign 104 has a light or safety light 136. The sign includes the word, "STOP" 138, written on both sides of it. Each bracket 112—two are shown in FIG. 3—receives a bottom portion 140 of a STOP sign 104 in the bracket 112 and is sandwiched into a portion of the bracket 112 as will be explained below. Fasteners, such as bolts 144 or screws, may be used to couple the bracket 112 and the sign 104. Fasteners 148 may be used to couple the bracket 112 to the arm 116. Reflective tape 150 may be applied to all or a portion of the arm 116. As shown in FIG. 4, in some embodiments, a second STOP sign 152 may be attached to the arm 116. The arm 116 has a first end 156 and a second end 160, or distal end. The second STOP 152 is coupled proximate the second end 160 using a second set of brackets 164, which are constructed in the same manner as and analogous to the brackets 112. The arm 116 has a longitudinal length 166 that is between 2 feet and 6 feet. Those skilled in the art will appreciate that other dimensions may be used.

Figure 5:
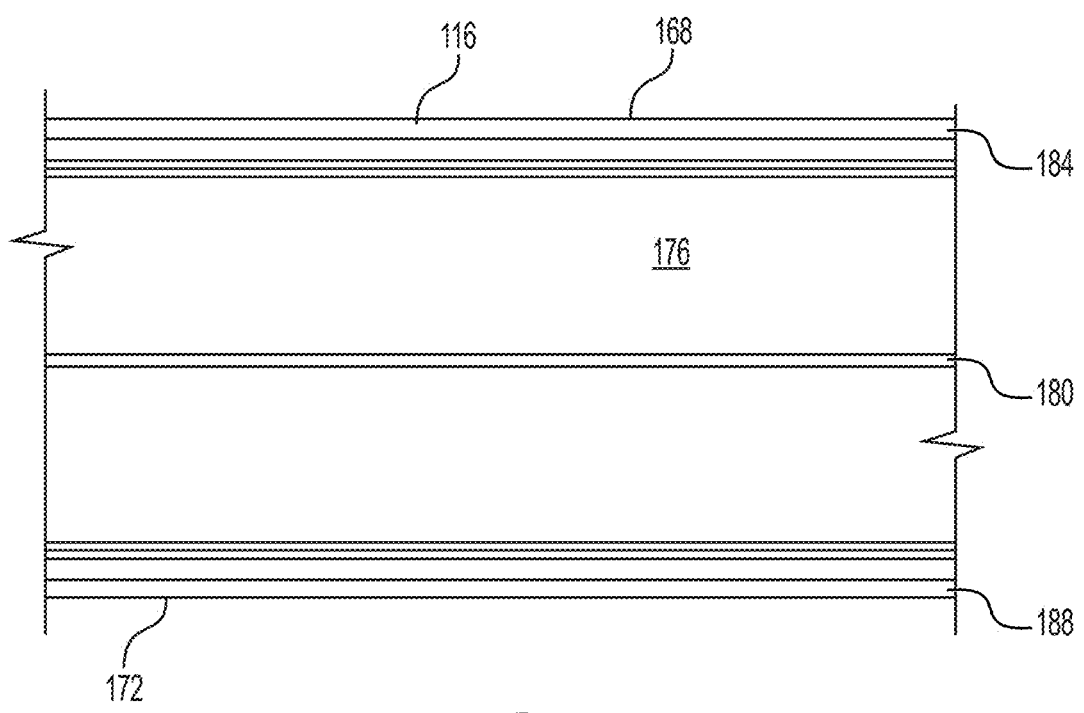
FIG. 5 is schematic elevation view of a portion of an illustrative embodiment of an arm for use as an aspect of a safety device.

Referring now primarily to FIG. 5, a portion of the arm 116 is shown. The arm 116 has a top 168 and a bottom 172 with a vertical portion 176 therebetween. The vertical portion 176 may include a rib 180 for strength. The arm 116 may have a first bulb 184, or a locator rail, formed at the top 168 and second bulb 188 formed at the bottom 172. The arm 116 may be formed from fiberglass or aluminum or other lightweight strong material. Alternatively, the arm 116 may be formed from another metal, such as steel or stainless steel or a polymer.

Figure 6:
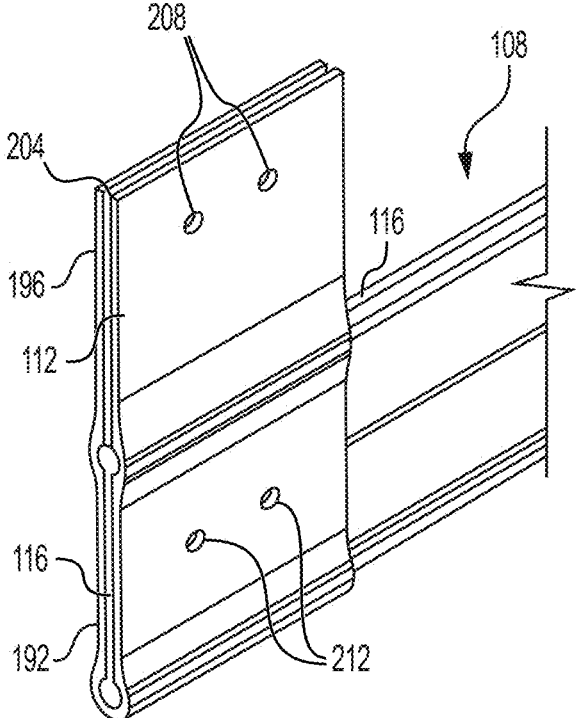
FIG. 6 is a schematic perspective view of a portion of a safety device showing an illustrative arm in a bracket according to an illustrative embodiment.

Referring now primarily to FIG. 6, a perspective view of a portion of the safety device 108 is shown. The arm 116 is shown at one end going into the bracket 112. The bracket 112 has a bottom portion 192 and a top portion 196. The arm 116 is coupled in the bottom portion 192, which includes a sleeve 200 (FIG. 7), and the top portion 196 includes a slot 204 that receives a portion of a sign. The top portion 196 includes a first set of apertures 208 for fasteners 144 (FIG. 3) to secure the sign in the slot 204. The bottom portion 192 includes a second set of apertures 212 for receiving fasteners 148 (FIG. 3) to secure the bracket 112 to the arm 116. The bracket 112 may be formed from any suitable materials which may be transparent or sufficiently translucent, e.g., clear polymers, clear polycarbonate, etc. Alternatively, the bracket 112 may be formed from an opaque material and be painted or otherwise marked so that the portion of the bracket 112 that overlaps a sign when installed mimics the portion of the sign that is covered by the bracket 112.

Figure 7:
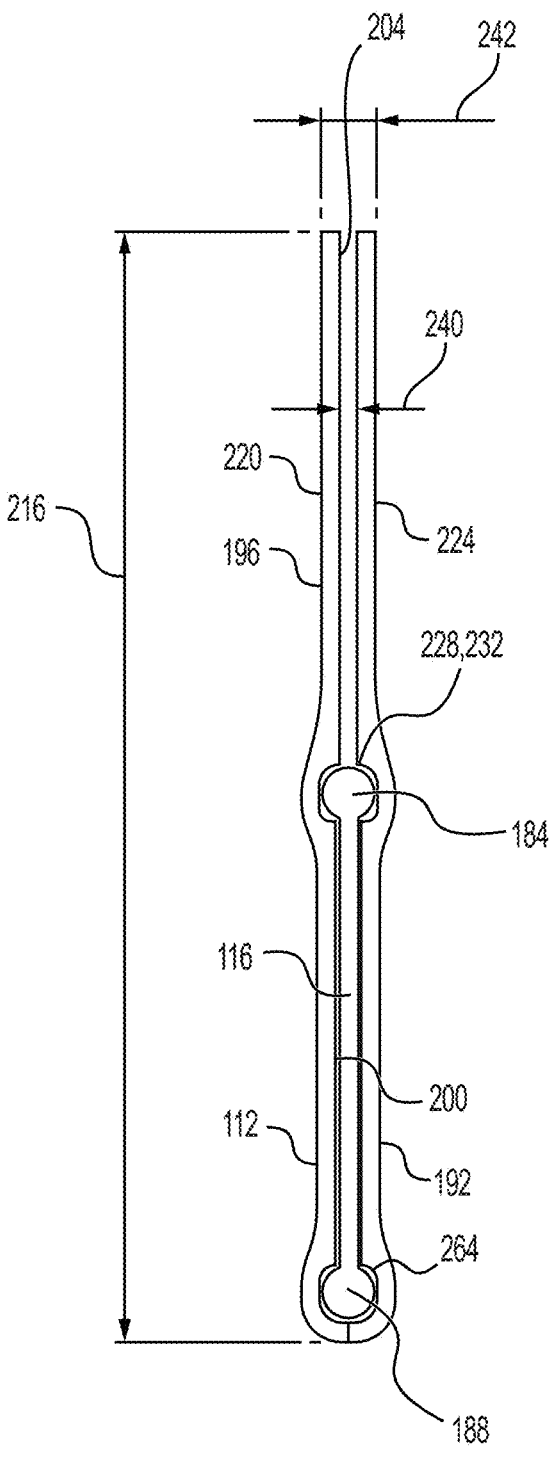
FIG. 7 is a schematic end-view of an illustrative arm shown in an illustrative bracket.
Figure 8:
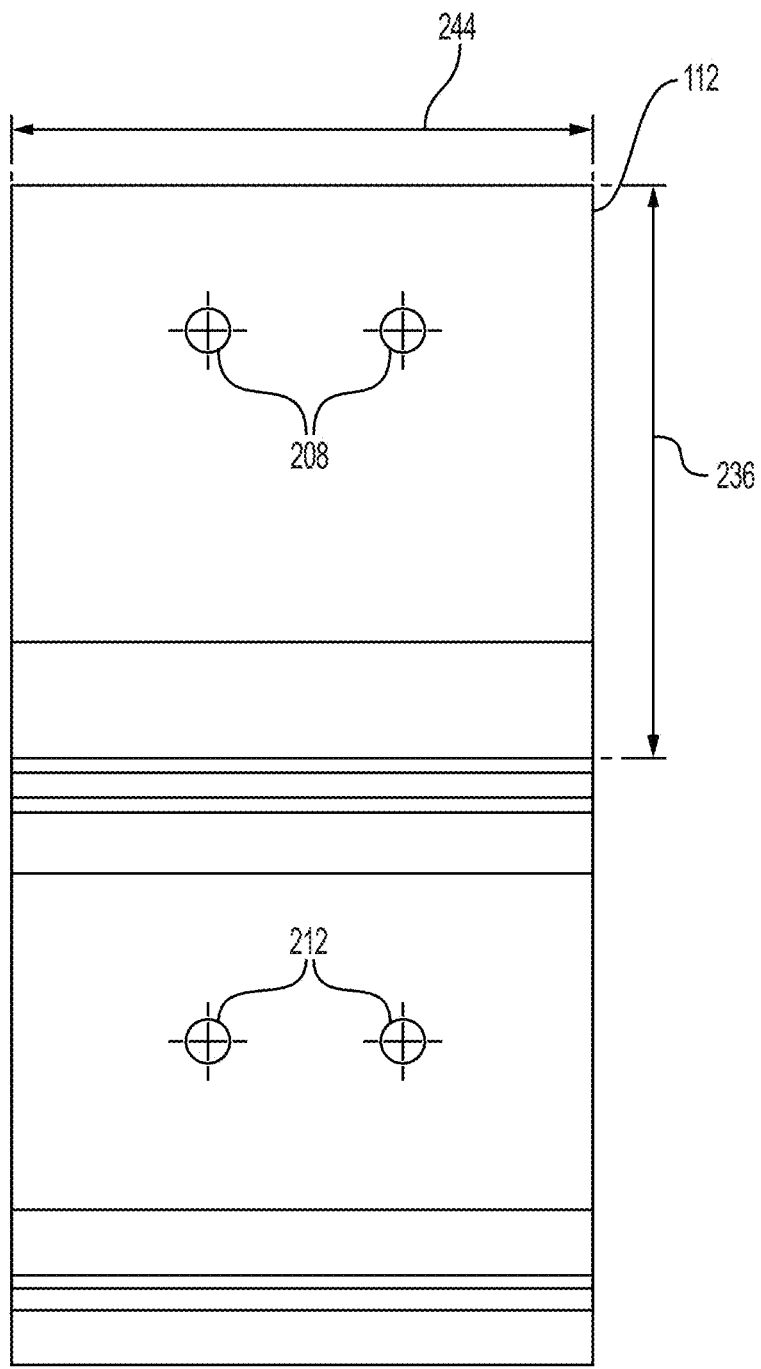
FIG. 8 is a schematic elevation view of an illustrative embodiment of a bracket.

Referring now primarily to FIGS. 7 and 8, the bracket 112 and arm 116 are shown in an end view. In this view, one may see the sleeve 200 in which the arm 116 is disposed. One may also see the slot 204 that receives a portion of a sign, e.g., pivotable sign 104 (FIG. 4) or second stop sign 152 (FIG. 4). The bracket 112 has a vertical dimension 216 in the range of 6 to 10 inches. Other dimension may be used. The top portion 196 has a first side 220 and a second side 224 that are opposite one another and form the slot 204. The two sides 220, 224 are pulled towards each other by the fasteners 144 (FIG. 3) to help secure and hold the sign 104, 152 (FIG. 4). A bottom portion 228 of the slot 204, which is also a top portion 232 of the sleeve 200, is sized and configured to receive the first bulb 184 with a clearance less than 0.05 inches in some embodiments. The slot 204 of the bracket 112 has a vertical dimension 236 in the range of 3 and 5 inches. The slot 204 has a gap dimension 240 in the range of 0.08 to 0.16 inches or otherwise sized to accommodate the thickness of the sign 104. The top portion 196 has an overall width dimension 242 in the range of 0.2 to 0.6 inches, and in one illustrative embodiment is 0.4 inches. The bracket 112 has longitudinal dimension 244 in the direction of the arm 116 when assembled in the range of 2.0 and 8.0 inches. Again, other dimensions are possible. The bracket 112 may be formed by two parts that are pulled together by fasteners, e.g., 144, 148.

Figure 10:
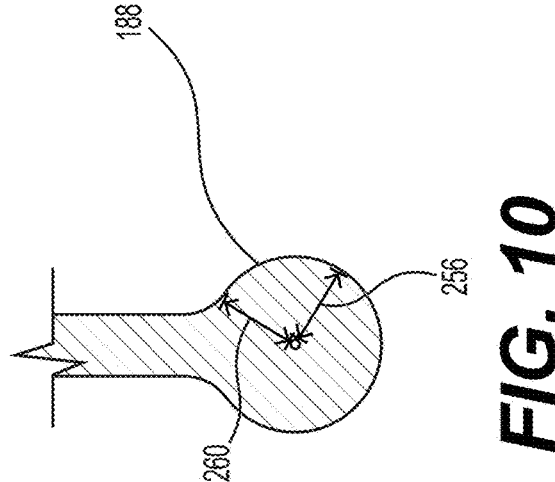
FIG. 10 is a detail of the cross-section of FIG. 9.
Figure 9:
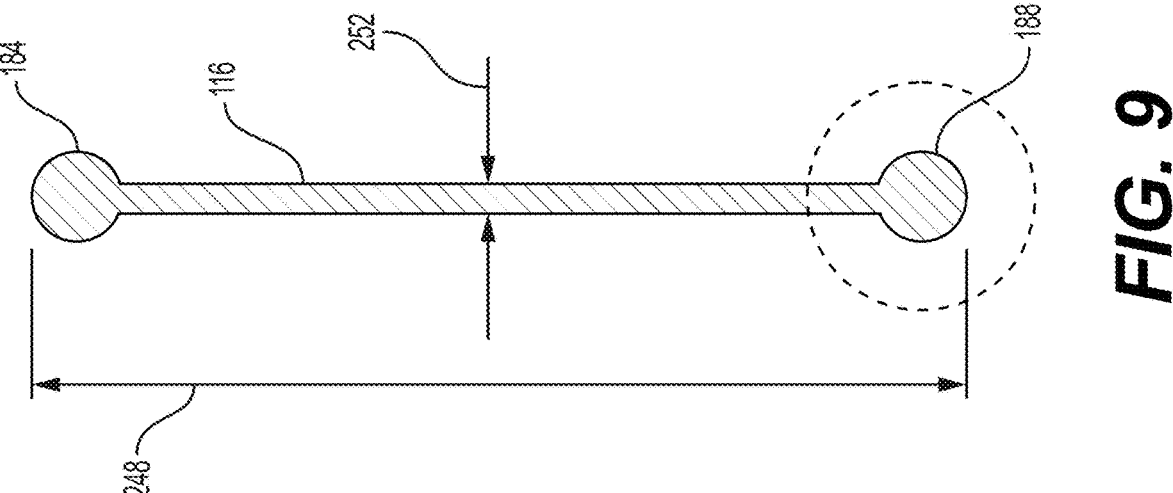
FIG. 9 is a schematic cross-sectional view of the arm shown if FIG. 7.

Referring now primarily to FIG. 9, a cross section of the arm 116 is shown. The arm 116 has a vertical dimension 248 in the range of 2 and 8 inches and in one embodiment is 3.94 inches. The arm 116 has a lateral width 252 of the vertical portion 176 (FIG. 5) in the range 0.05 to 0.25 inches. FIG. 10 shows the second bulb 188 has first radius 256 in the range of 0.1 to 0.3 inches and in one embodiment is 0.19 inches. The second bulb 188 terminates with a second radius 260, which is in the range of 0.06 to 0.1 inches and in one embodiment is 0.07 inches. The first bulb 184, in the depicted embodiment has the same size and shape as the second bulb 188. In other embodiments, first bulb 184 and second bulb have different sizes and shapes.

Figure 11:
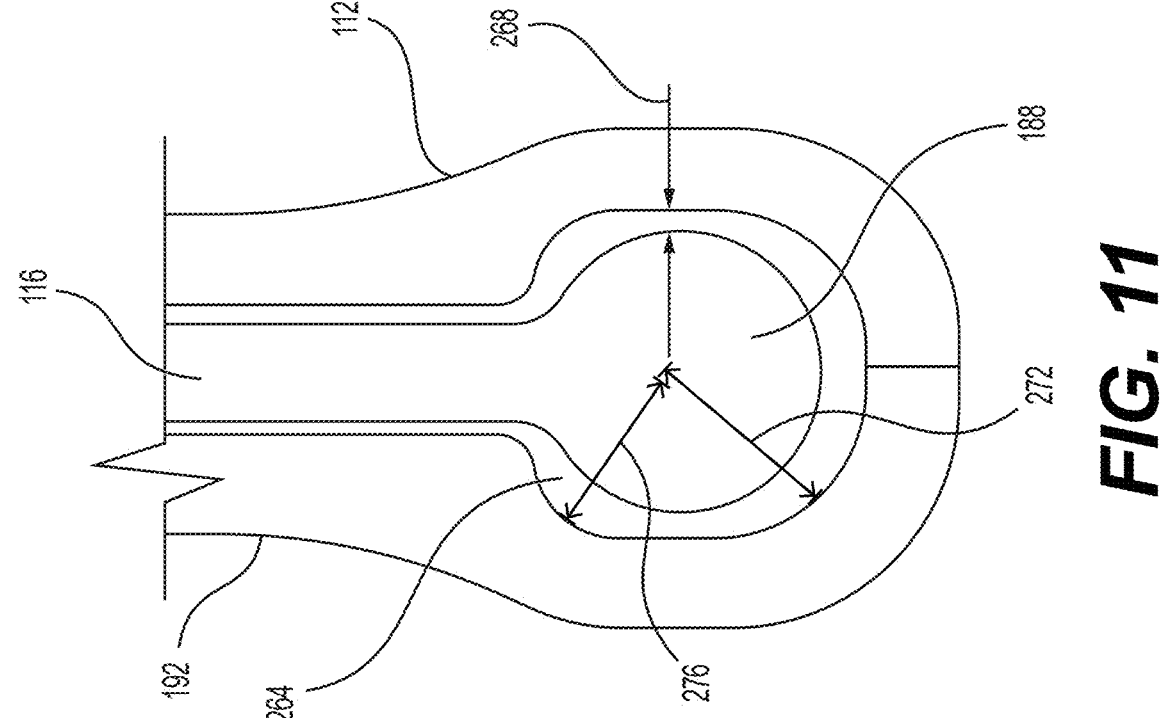
FIG. 11 is a detail end view of a bottom portion of an arm within a bracket according to an illustrative embodiment.
Figure 13:
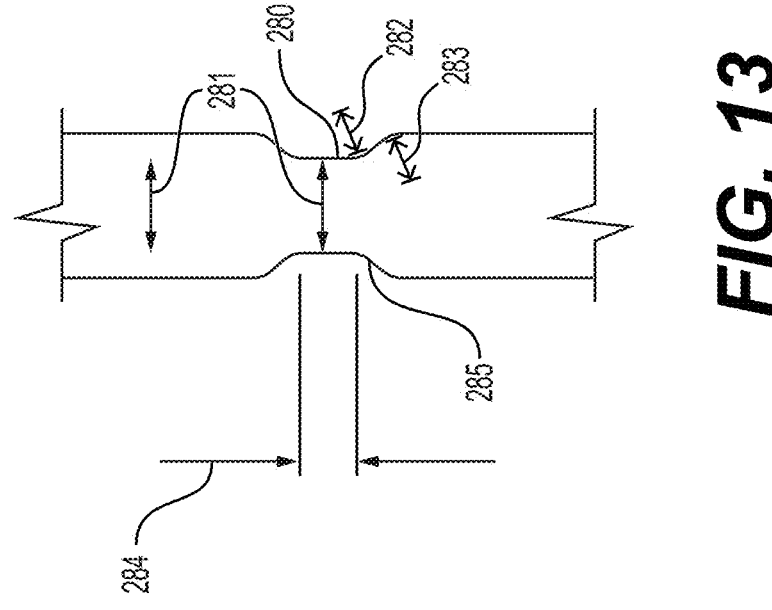
FIG. 13 is a schematic detail of a portion of the arm of FIG. 12.
Figure 12:
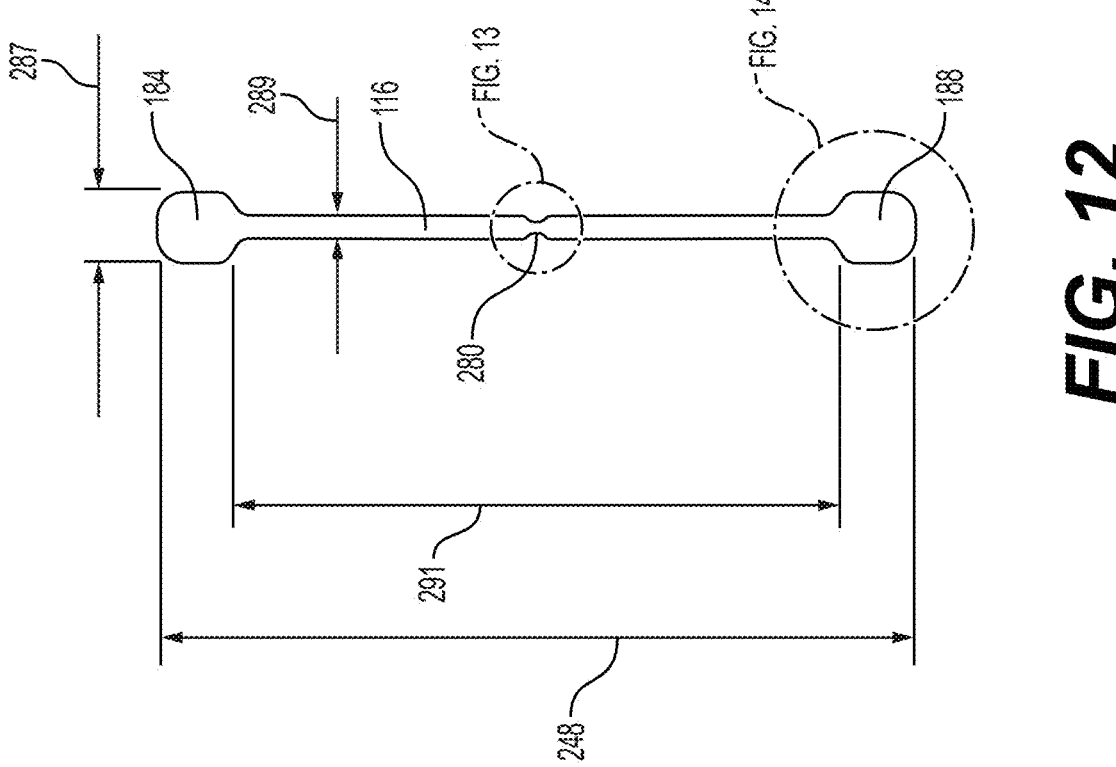
FIG. 12 is a schematic end-view of another illustrative embodiment of an arm.

Referring now primarily to FIG. 11, the lowest portion of the bottom portion 192 has a bottom portion 264 that is sized and configured to receive the second bulb 188 with a gap 268 between the arm 116 and bracket 112. In one illustrative embodiment, the gap 268 is between 0.01 and 0.04 inches and in one illustrative embodiment is 0.023 inches. The bottom portion 264 has a primary radius 272 and secondary radius 276. In one illustrative embodiment, the primary radius is between 0.1 and 0.25 inches and the secondary radius 276 is between 0.05 and 0.12 inches. Again, other dimensions are possible.

Figure 15:
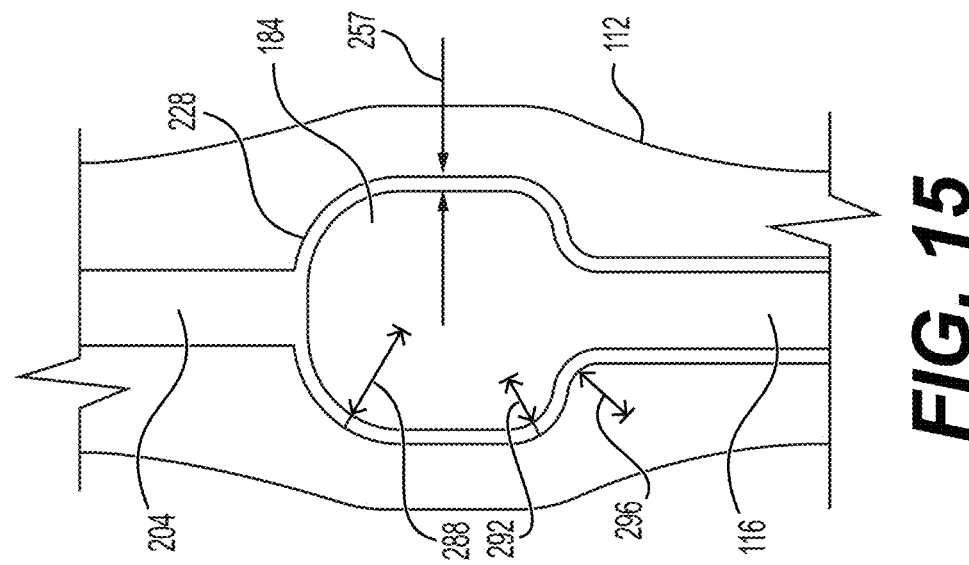
FIG. 15 is a schematic end-view of a top portion of an arm within a bracket according to an illustrative embodiment.
Figure 14:
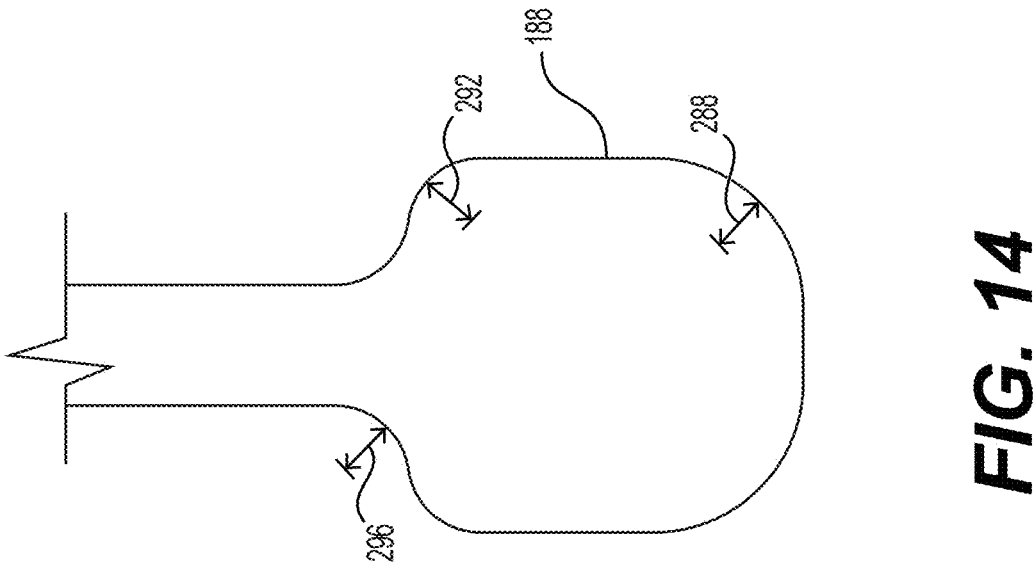
FIG. 14 is another schematic detail of a portion of the arm of FIG. 12.

Referring now primarily to FIGS. 12-15, an alternative embodiment of an arm 116 is presented. The arm has differently shaped bulbs 184, 188 and is formed with a rib 280, or indented rib. The rib 280 may have a vertical dimension 284. In some embodiments, vertical dimension 284 is in the range of 0.05-0.12 inches. In one embodiment, vertical dimension 284 is 0.085 inches. The indented rib 280 may have a horizontal dimension 281. In some embodiments, horizontal dimension 281 is in the range of 0.04 to 0.6 inches. The transition area 285 has two radii: 282, 283. In some embodiments, radii 282 and 283 are in the range of 0.1-0.5 inches. In some embodiments, radii 282 and 283 are both 0.25 inches. The first bulb 184 and the second bulb 188 may have three radii: 288, 292, 296. As shown in FIG. 15, the bracket's top portion 228 is sized and configured to receive the first bulb 184 with a gap 257 between the arm 116 and bracket 112. In one illustrative embodiment, the gap 257 is between 0.01 and 0.04 inches and in one illustrative embodiment is 0.023 inches. The first bulb 184 has a first bulb width 287 (FIG. 12) that is in the range of 0.3 to 0.4 inches. The vertical portion 176 (see FIG. 5) has a vertical dimension 291 (FIG. 12) in the range of 1.2 to 7.2 inches. Likewise, the bracket's bottom portion 264 is sized and configured to receive the second bulb 188 in an analogous fashion. In some embodiments, the first bulb 184 and the second bulb 188 have the same size and shape. In some embodiments, first bulb 184 and the second bulb 188 have different sizes or shapes, and the corresponding top portion 228 and bottom portion 264 are sized and configured to receive the first bulb 184 and the second bulb 188, respectively.

Figure 16:
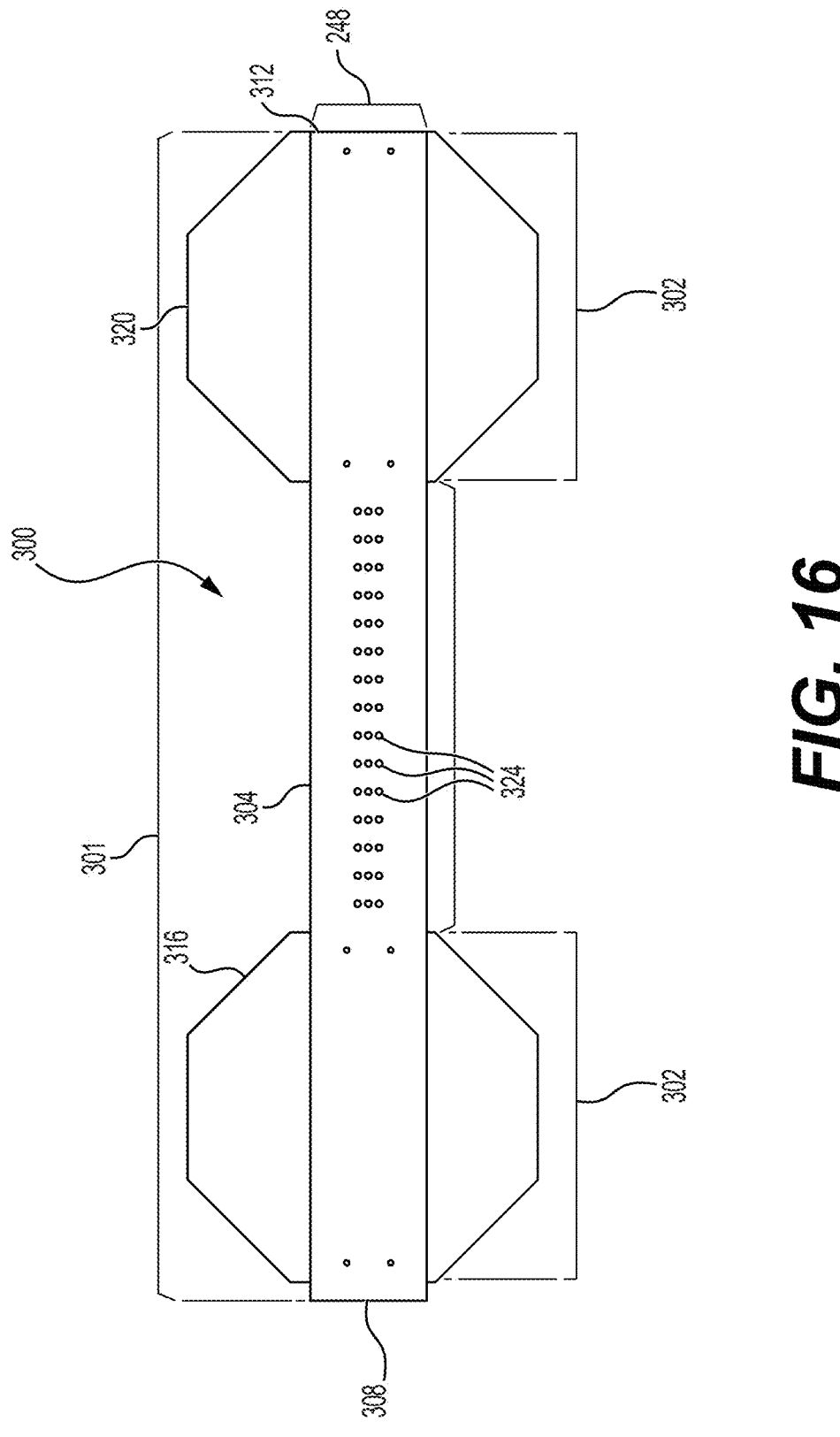
FIG. 16 is a schematic illustrative embodiment of a safety device for mounting to a bus, which has a pivotable STOP sign, and includes an arm extending to a second STOP sign.
Figure 17:
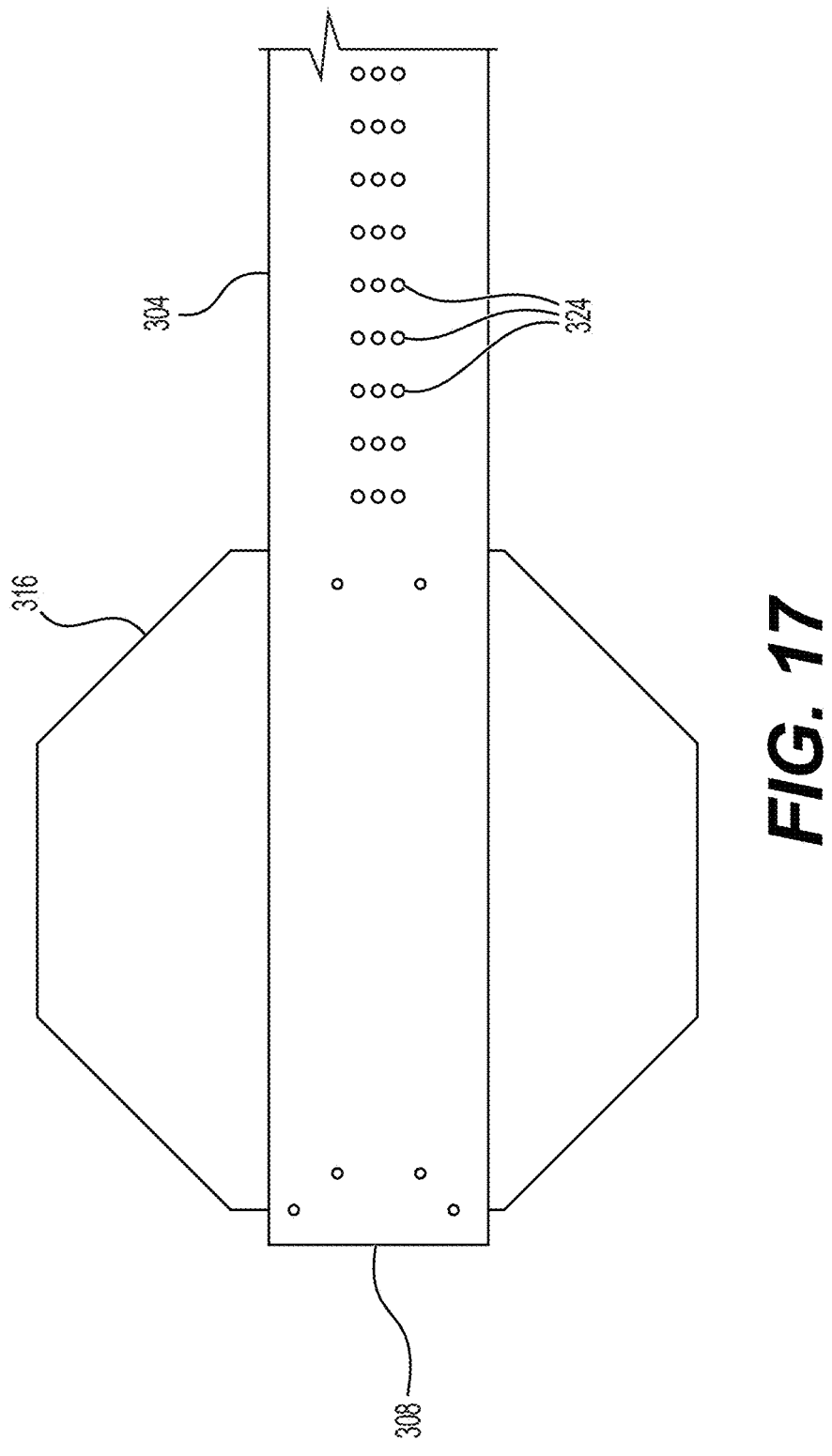
FIG. 17 is a detail of a portion of the safety device of FIG. 16.

Referring now primarily to FIGS. 16-17, another illustrative embodiment of the safety device 300 is shown that is suitable for original equipment manufacturer (OEM) of buses or retrofit. The safety device 300 may include an aluminum or fiberglass arm 304 that has a first end 308 and a second end 312. The arm 304 is coupled to a first stop sign 316 at the first end 308. The first end 308 is coupled to a pivoting assembly (not explicitly shown) or motor-driven pivotable mount (see 106 in FIG. 1) as one skilled in the art will understand. On the second end 312 of the arm 304, a second stop sign 320 is coupled. A plurality of lights 324 are coupled on the arm 304.

According to an illustrative embodiment, a safety device 300 for mounting to a pivoting stop sign 316 on a school bus 100 includes an arm 304 that in cross section has a vertical dimension (see e.g., 248 in FIG. 12) and a horizontal dimension (see e.g., 252 in FIG. 9). The ratio of the horizontal dimension 252 to the vertical dimension 248 is 0.32 and in another embodiment is in the range 0.00625 to 0.125. In one embodiment, the arm 304 has a vertical dimension 248 in the range of 4-8 inches. In one embodiment, vertical dimension 248 is 6 inches. The arm 304 has a longitudinal length 301 in the range of 2 to 6 feet. The first stop sign 316 and the second stop sign 320 have a width 302 in the range of 1-2 feet. In some embodiments width 302 is 1.5 feet.

According to an illustrative embodiment, a method of improving the safety of a school bus 100 having a pivotable stop sign 104 on a left side of the bus 100, the method includes providing a clear polycarbonate bracket 112 having a slot 204 for receiving a portion of the pivotable stop sign 104 and coupling the bracket 112 to the pivotable stop sign 104. The method also includes coupling a fiberglass or aluminum arm 116 to the bracket 112 such that when the pivotable stop sign 104 is extended, the arm 116 extends outward from the bus 100 by at least two feet. The arm 116 has a plurality of lights 120 coupled thereto.

In one illustrative embodiment, an existing bus 100 is retrofitted with the safety device 108 according to the following steps:

Open side panel on the school bus and disconnect power to the stop arm box (motor-driven pivotable mount 106 in FIG. 1).

Remove the screws, e.g., 5/16-inch screws, from the front and back of the stop arm box and take the cover off.

Open stop arm manually.

Take out the 4 plastic brackets 112. Place one bracket on the left end of the arm 116 extension (the side with the wires is the backside of the arm), mark the two holes in the bracket 112. On the marks, using a drill bit, e.g., 3/8", drill the two marked holes. Take two of the plastic brackets 112 and using two bolts, four washers and two nuts install the bracket 112 to the arm 116 (nuts should be facing the back of the arm).

Measure light 136 (FIG. 2) on the stop arm (the existing stub arm on the pivotable stop sign 104) and add 1/4 inch (usually 5" lights 136). Measuring from the left bracket 112 the distance of light 136 plus 1/4 inch, mark the two holes in the bracket 112. On the marks, using a drill bit (e.g., 3/8"), drill the two marked holes. Take the two plastic brackets 112 and using two bolts, four washers and two nuts install the bracket 112 to the arm 116 (nuts should be facing the back of the arm).

Using a clamp or by holding in place, put the arm 116 on the stop arm, centering the bracket 112 around the stop arm light 136 (brackets 112 go on the outside on either side of the stop sign 104). The top of the arm 116 should be resting on the bottom of the stop sign 104 and arm 116 should be level horizontally. Mark the four drill holes 208, 212. Remove the arm 116, and on the marks, using a drill bit, drill the four marked holes. Place the arm 116 back on the stop sign 104 and using four bolts, eight washers and four nuts install the brackets 112 to the stop sign 104 (nuts should be facing the back of the arm, i.e., toward rear).

Take the wire harness and route towards the lower part of the stop arm box. Push the wires through the grommet on the bottom of the stop arm box. Use heat shrink butt connectors, reds together and blacks together to make a connection. Take a wire and put red with red and black with black.

Use a black wire to ground (use the ground connector).

Using a "T" connector, place on blue trip wire (if needing to flash, place on flasher wire) and connect red wire to the connector.

Take excess wire and wrap inside stop arm box leaving some slack for the arm 116 to move from the stop arm box.

Place a plastic tubing over wires to keep together.

Place the cover back onto stop arm box and secure with screws (e.g., 5/16 screws).

Return power to the stop arm box. The stop arm should cradle itself.

Start the school bus and turn on master switch, activate the eight-way yellows, open service door. The stop arm should deploy with the arm 116 now illuminated.

There are many examples of the various embodiments described herein. A number of examples follow.

Example 1. A safety device for mounting to a pivoting stop sign on a school bus, the safety device comprising:

a first bracket having a slot for receiving a portion of the pivoting sign, wherein the first bracket is formed from a polymer material that is transparent or translucent;

an arm having a first end and a second end, wherein the first end is coupled to the first bracket, and wherein the arm has a longitudinal length in the range of two feet to six feet; and a plurality of lights coupled to the arm.

Example 2. The safety device of Example 1, further comprising reflective safety tape coupled to the arm along the longitudinal length of the arm.

Example 3. The safety device of Example 1, wherein the arm comprises fiberglass.

Example 4. The safety device of Example 1, wherein the first bracket comprises a clear polycarbonate material.

Example 5. The safety device of Example 1, wherein the first bracket has a vertical dimension in the range of 6 to 10 inches.

Example 6. The safety device of Example 1, wherein the first bracket has a plurality of apertures through the first bracket, and further comprising a plurality of fasteners extending through the plurality of apertures and pulling opposite sides of the slot towards each other.

Example 7. The safety device of Example 1, wherein the arm in a lateral cross section has a first bulb on a top end and a second bulb on a second end.

Example 8. The safety device of Example 1, wherein the arm in a lateral cross section has a first bulb on a top end and a second bulb on a second end; and wherein a bottom portion of the slot is sized and configured to receive the first bulb with a clearance less than 0.05 inches.

Example 9. The safety device of Example 1, wherein the slot has a vertical dimension in the range of 3 and 5 inches.

Example 10. The safety device of Example 1, wherein the slot has a gap dimension in the range of 0.8 and 0.3 inches.

Example 11. The safety device of Example 1, wherein the first bracket has longitudinal dimension in the direction of the arm when assembled in the range of 2.0 and 8.0 inches.

Example 12. The safety device of Example 1, wherein the first bracket has longitudinal dimension in the direction of the arm when assembled is 4 inches.

Example 13. The safety device of Example 1, further comprising a second bracket coupled to the second end of the arm, and a second stop sign coupled to the second bracket.

Example 14. The safety device of Example 1:

further comprising reflective safety tape coupled to the arm along the longitudinal length of the arm;

wherein the arm comprises fiberglass;

wherein the bracket comprises a clear polycarbonate material;

wherein the bracket has a plurality of apertures through the bracket, and further comprising a plurality of fasteners extending through the plurality of apertures and pulling opposite sides of the slot towards each other;

wherein the bracket has a vertical dimension in the range of 6 to 10 inches;

wherein the slot has a vertical dimension in the range of 3 and 5 inches;

wherein the slot has a gap dimension in the range of 0.8 and 0.3 inches;

wherein the bracket has longitudinal dimension in the direction of the arm when assembled in the range of 2.0 and 8.0 inches; and wherein the arm in a lateral cross section has a first bulb on a top end and a second bulb on a second end; and wherein a bottom portion of the slot is sized and configured to receive the first bulb with a clearance less than 0.05 inches.

Example 15. A safety device for mounting to a pivoting stop sign on a school bus, the safety device comprising:

an arm that in cross section has a vertical dimension and a horizontal dimension wherein the ratio of the horizontal dimension to the vertical dimension is less than 0.4, wherein the arm has a first longitudinal end and a second longitudinal end;

wherein the arm has a longitudinal length in the range of 1 to 6 feet;

a second stop sign;

wherein the first longitudinal end is coupled to the pivoting stop sign and the second longitudinal end is coupled to the second stop sign; and a plurality of lights coupled to the arm.

Example 16. The safety device of claim 15, wherein the plurality of lights comprises LED lights.

Example 17. A method of improving the safety of a school bus having a pivotable stop sign on a left side of the bus, the method comprising:

providing a clear polycarbonate bracket having a slot for receiving a portion of the pivotable stop sign;

coupling the bracket to the pivotable stop sign;

coupling a fiberglass or aluminum arm to the bracket such that when the pivotable stop sign is extended, the arm extends outward from the bus by at least two feet; and wherein the arm has a plurality of lights coupled thereto.

Figure 18:
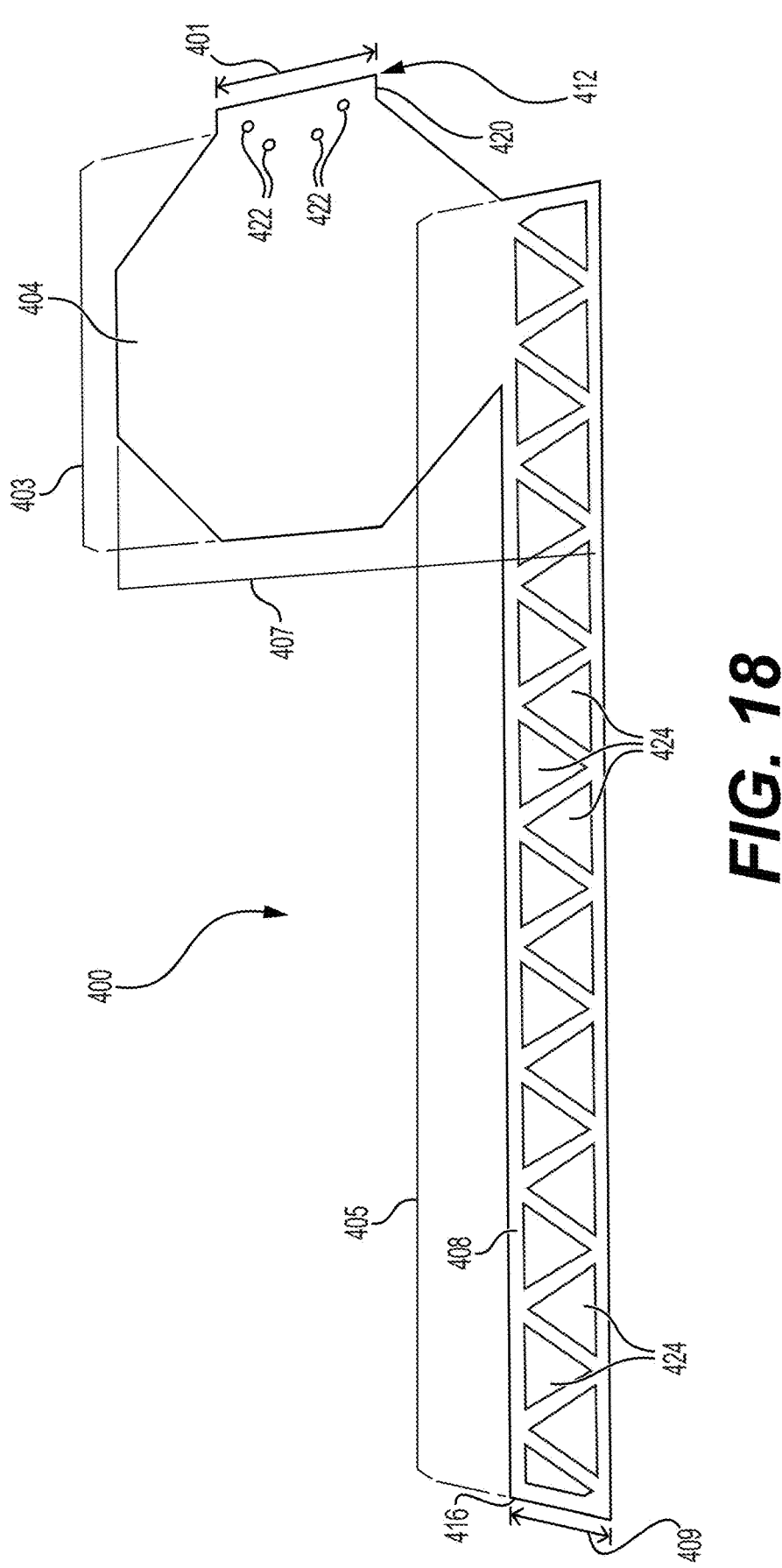
FIG. 18 is an illustrative embodiment of a one-piece safety device with a pivotable STOP sign and arm.

Referring now primarily to FIG. 18, another embodiment of a safety device is shown. The safety device 400 is shown. The safety device 400 is configured for OEM installation on a school bus, for installation on a school bus that does not currently have a pivoting stop sign, or to replace a pivoting stop sign on a school bus. The safety device 400 is a single unit safety device, which incorporates both a STOP sign portion 404 and an arm portion 408 or arm, into a single unit. The safety device 400 has a first, or proximate end 412, and a second, or distal end 416. The STOP sign portion 404 is located near the proximate end 412. One side of the STOP sign portion 404 has a mounting bracket 420, or mounting portion, extending as a wing from the STOP sign portion 404 to form the proximate end of the safety device 400. In some embodiments, the mounting bracket 420 has a vertical length 401 in the range of 5-10 inches. In some embodiments, the vertical length 401 is 7¹/₁₆ inches. Mounting holes 422 are located within the wing formed by the mounting bracket 420. The mounting holes 422 are used to attach the safety device 400 to a pivoting mount (e.g., motor-driven pivotable mount 106 in FIG. 1) on a school bus. The STOP sign portion 404 has a width dimension 403 or longitudinal dimension. In some embodiments, the width dimension 403 is in the range of 1-2 feet. In some embodiments, the width dimension 403 is 1.5 feet. The arm 408 has a longitudinal length dimension 405. In some embodiments, the length dimension 405 is in the range of 2-6 feet. In some embodiments the length dimension 405 is in 4 feet 4¼ inches. The arm 408 has a height dimension 409 or vertical dimension. In some embodiments, the height dimension 409 is in the range of 3-8 inches. In some embodiments, the height dimension 409 is 6 inches. The safety device 400 has a height dimension 407 or vertical dimension. In some embodiments, the height dimension 407 is in the range of 1.5-2.5 feet. In some embodiments, the height dimension 407 is 1 foot 10 inches. The pivoting mount is motor driven to cause the safety device 400 to move from a non-deployed state, in which the safety device 400 is substantially parallel to the school bus, to a deployed state (see FIG. 1), in which the safety device 400 has been pivoted so that it is substantially perpendicular to the school bus. The arm portion 408 extends from a lower edge of the STOP sign portion 404 to the distal end 416 of the safety device 400. A plurality of weight reduction cutouts 424 is cut out of an interior portion of the arm portion 408 to form openings within the arm portion 408. The weight reduction cutouts 424 reduce the overall weight of the safety device 400, reduce air drag on the safety device 400, and provide visibility through the arm 408 when the arm 408 is in a deployed state. In the embodiment shown, the weight reduction cutouts 424 are shown as multiple weight reduction cutouts 424 that are triangular in shape and alternate upwards and downwards along the length of the arm 408. In other embodiments, the size, shape, and number of weight reduction cutouts 424 can vary. For example, weight reduction cutouts may be circular, oval, square, rectangular, polygonal, or a combination of shapes with the same or different sizes.

The safety device 400 may be manufactured from a single sheet of material so that there is no need to provide mounting or connection portions or devices between the mounting bracket 420 and the STOP sign portion 404 and between the STOP sign portion 404 and the arm portion 408. The safety device 400 may be manufactured from fiberglass, plastic, aluminum, other metal, such as steel or stainless steel, or rubber. The safety device 400 may be formed by cutting or molding a material. In some embodiments, the safety device 400 is cut from a single sheet of material. In some embodiments, the safety device 400 is cut with a laser or CNC machine. In a preferred embodiment, the safety device 400 is laser cut from a single sheet of aluminum.

Figure 19:
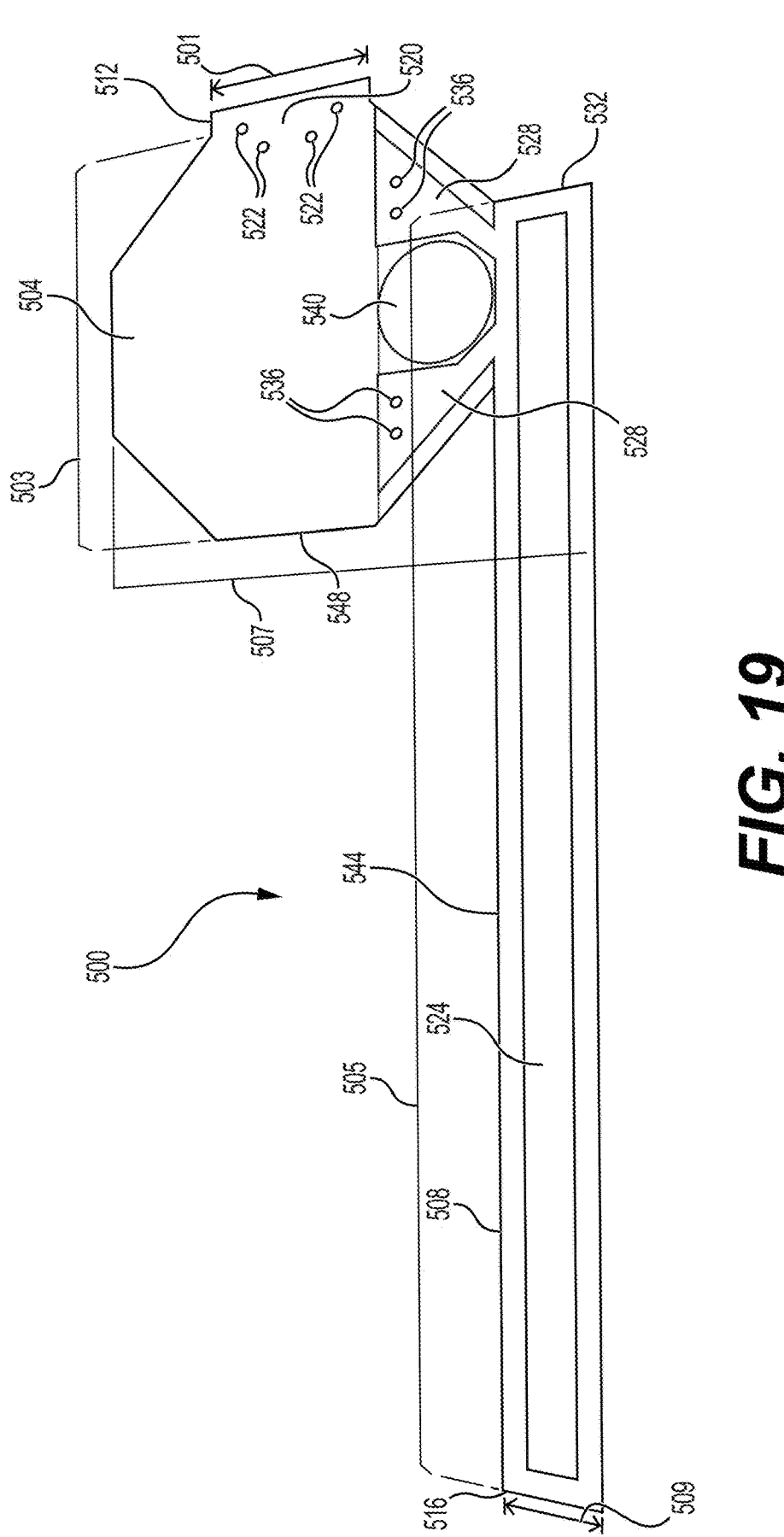
FIG. 19 is an illustrative embodiment of a multiple-piece safety device with a pivotable STOP sign and arm.

Referring now primarily to FIG. 19, another embodiment of a safety device 500 is shown. The safety device 500 is very similar to the safety device 400 of FIG. 4 described above. The safety device 500 has a mounting bracket 520 on its proximate end 512 end is formed with mounting holes 522 for mounting the safety device 500 to a pivoting mount (e.g., 106 in FIG. 1) on a school bus, as described in relation to the safety device 400. The STOP sign portion 504 extends from the mounting bracket 520 toward the distal end 516 of the safety device 500. The safety device 500 also has weight reduction cutout 524, which provides the same function and has the same possible variations as described above in relation to the weight reduction cutouts 424 of the safety device 400. In the embodiment of FIG. 19, there is only one weight reduction cutout 524, which is rectangular in shape.

The STOP sign portion 504 has a width dimension 503 or horizontal dimension. In some embodiments, the width dimension 503 is in the range of 1-2 feet. In some embodiments, the width dimension 503 is 1.5 feet. An arm 508 has a length dimension 505 or longitudinal dimension. In some embodiments, the length dimension 505 is in the range of 2-6 feet. In some embodiments, the length dimension 505 is in 4 feet 4¼ inches. The arm 508 has height dimension 509 or vertical dimension. In some embodiments, the height dimension 509 is in the range of 3-8 inches. In some embodiments, the height dimension 509 is 6 inches. The safety device 500 has height dimension 507 or vertical dimension. In some embodiments, the height dimension 507 is in the range of 1.5-2.5 feet. In some embodiments, the height dimension 507 is 1 foot 10 inches.

However, the safety device 500 varies from the safety device 400 in that the safety device 500 is a multiple-piece safety device, e.g., a two-piece safety device, wherein the STOP sign portion 504 and the mounting bracket 520 form a first half 548 of the safety device 500, and the arm portion 508 and mounting ears 528 form a second half 544 of the safety device 500. The mounting ears 528 extend from the top of a proximate end 532 of the arm portion 508 and provide a mounting space for attaching the first half 548 of the safety device 500 with the second half 544 of the safety device 500, using mounting holes 536 end and fasteners. The mounting ears 528 are configured so that they provide maximum overlap with the lower portion of the STOP sign portion 504 but do not extend beyond the outer edges of the STOP sign portion 504 or interfere with light 540, which may be present in some embodiments. The light 540 activates when safety device 500 is in a deployed state to provide additional driver visibility.

In some embodiments, the safety device 500 is made of the multiple portions, e.g., two halves 544, 548 of the safety device 500, attached together as a single unit. In these embodiments, the safety device 500 may be used as OEM equipment or installed on a bus without an existing pivoting stop sign. In other embodiments, the safety device 500 is only the second half 544 of the safety device 500 described above, which is the half containing the arm portion 508 and the mounting ears 528. These embodiments of the safety device 500 can be used to retro fit a bus that already has a pivoting stop sign similar to the STOP sign portion 504. In these embodiments, the safety device is attached to the existing pivoting stop sign of a bus.

Either variation of the safety device 500 described above may be manufactured from fiberglass, plastic, aluminum, other metal, such as steel or stainless steel, or rubber. The safety device 500 may be formed by cutting or molding a material. In some embodiments, the safety device 500 is cut from a single sheet of material. In some embodiments, the safety device 500 is cut with a laser or CNC machine. In an embodiment, the safety device 500 is laser cut from a single sheet of aluminum.

Figure 20:
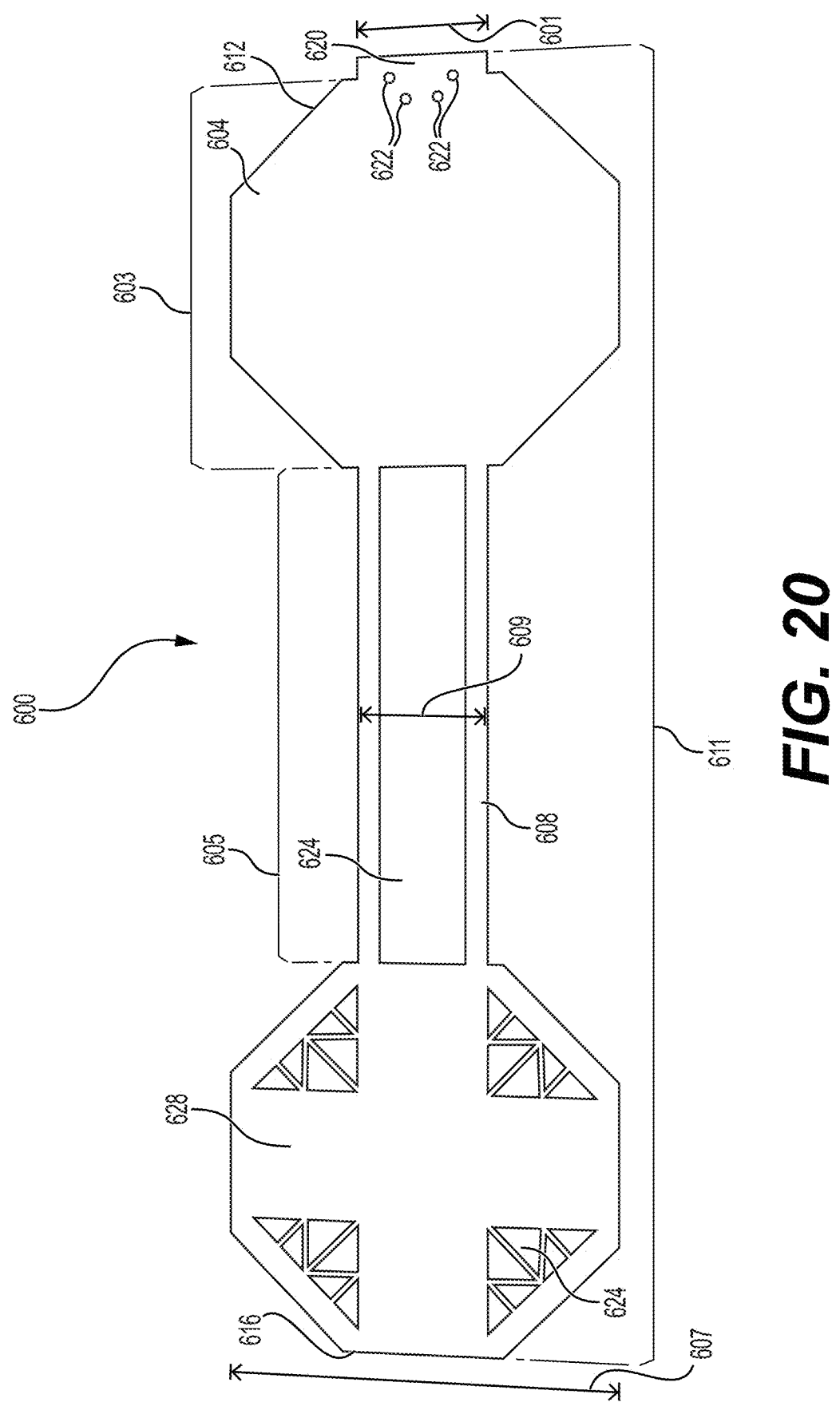
FIG. 20 is an illustrative embodiment of a one-piece safety device with a pivotable STOP sign, an arm, and a second STOP sign.

Referring now primarily to FIG. 20, another illustrative embodiment of a safety device 600 is shown. The safety device 600 is shown. The safety device 600 is similar to safety device 400 in that safety device 600 incorporates a first STOP sign portion 604, a mounting bracket 620, an arm portion 608, with a weight reduction cutout 624 cut out of the arm portion 608. The safety device 600 has a proximate end 612 and a distal end 616. Like described in relation to the safety device 400 in relation to FIG. 18, the mounting bracket 620 is located on the proximate end 612 of the safety device 600 and includes mounting holes 622 for mounting the safety device 600 onto a pivoting mount (e.g., 106 in FIG. 1) of a school bus. The first STOP sign portion 604 extends from the mounting bracket 620 away from the proximate end 612 of the safety device 600. In the safety device 600 the arm portion 608 extends from the first STOP sign portion 604 toward the distal end 616 of the safety device 600. The arm portion 608 contains a weight reduction cutout 624, which is similar to weight reduction cutout 424 of FIG. 18 and may be formed with the variations as described in relation to weight reduction cutout 424. The safety device 600 differs from the safety device 400 of FIG. 18 in that the safety device's 600 distal end 616 is not terminated by the arm portion 608. Instead, a second STOP sign portion 628 extends from the arm portion 608 to form the distal end 616 of the safety device 600. The second STOP sign portion 628 is a second stop sign to provide additional visibility to drivers to warn them of the need to stop for passengers that are leaving or entering a bus. Like the first STOP sign portion 604, the second STOP sign portion 628 has the word STOP printed on the front and back. In some embodiments, the second STOP sign portion 628 contains additional weight reduction cutouts 624 of various sizes and shapes to reduce the overall weight and wind resistance of the safety device 600 while maintaining structural integrity of the safety device 600.

The first STOP sign portion 604 has width dimension 603 or longitudinal dimension. In some embodiments, the width dimension 603 is in the range of 1-2 feet. In some embodiments, the width dimension 603 is 1.5 feet. The arm 608 has length dimension 605 or longitudinal dimension. In some embodiments, the length dimension 605 is in the range of 1-3 feet. In some embodiments, the length dimension 605 is in 1 foot 11 inches. The arm 608 has height dimension 609 or vertical dimension. In some embodiments, the height dimension 609 is in the range of 3-8 inches. In some embodiments, the height dimension 609 is 6 inches. The safety device 600 has height dimension 607. In some embodiments, the height dimension 607 is in the range of 1.5-2.5 feet. In some embodiments, the height dimension 607 is 1 foot 6 inches. The safety device 600 has overall longitudinal length 611. In some embodiments, the overall length 611 is in the range of 3-8 feet. In some embodiments, overall length 611 is 5 feet.

Like the safety device 400, the safety device 600 may be a one-piece safety device without a need for attaching together the mounting bracket 620, the first STOP sign portion 604, the arm portion 608, and the second STOP sign portion 628. In some embodiments, constituent components may be coupled. The safety device 600 may be manufactured from fiberglass, plastic, aluminum, other metal, such as steel or stainless steel. The safety device 600 may be formed by cutting or molding a material. In some embodiments, the safety device 600 is cut from a single sheet of material. In some embodiments, the safety device 600 is cut with a laser or CNC machine. In an embodiment, the safety device 600 is laser cut from a single sheet of aluminum.

Figure 21:
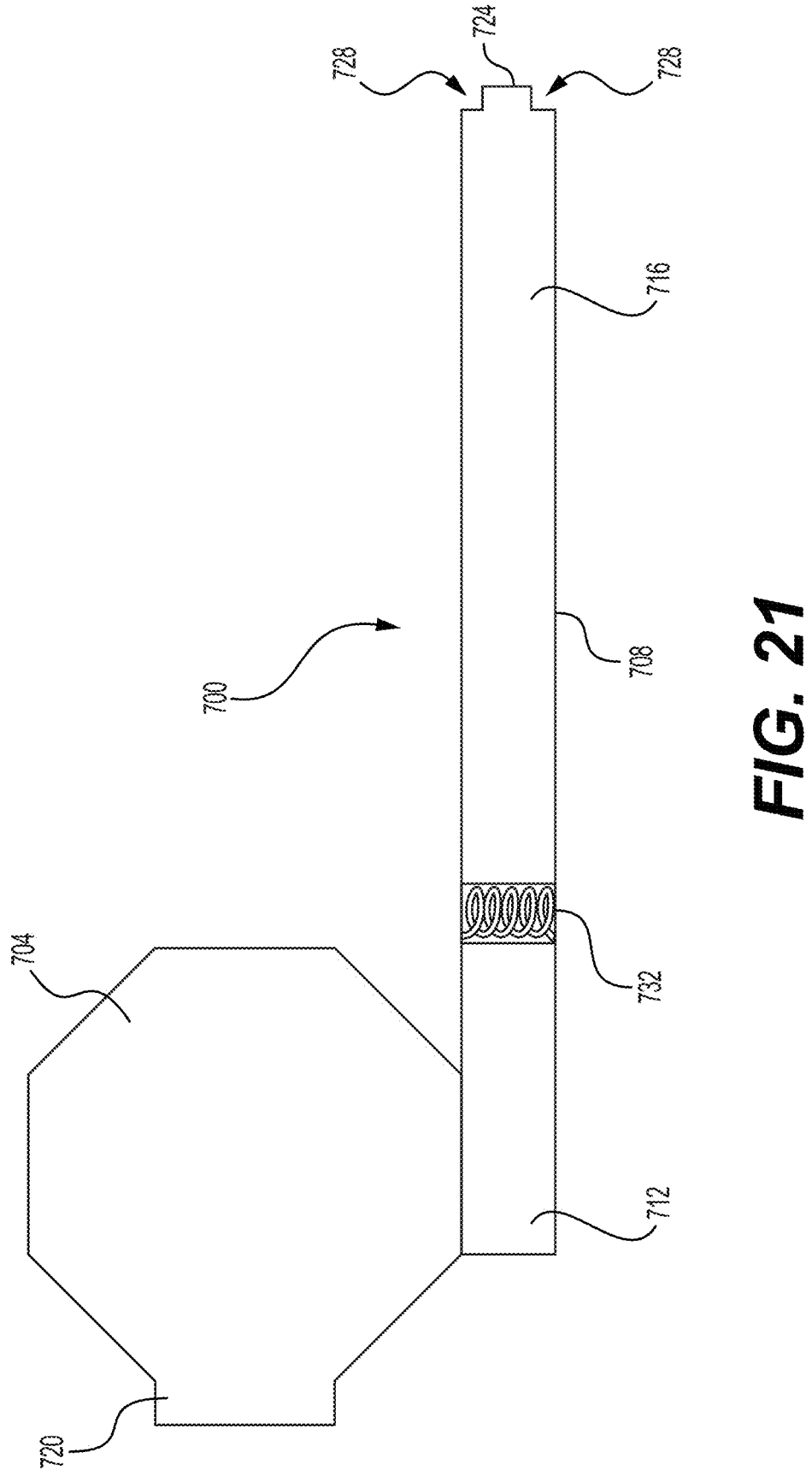
FIG. 21 is an illustrative embodiment of an arm of a safety device having a hinged section.

Referring now primarily to FIG. 21, an illustrative embodiment of a safety device 700 is shown. The safety device 700 is similar to the safety device 400 of FIG. 4, having an arm portion 708, a STOP sign portion 704, and a mounting bracket 720. The principal difference between the safety device 400 of FIG. 4 and the safety device 700 of FIG. 18 is that arm portion 708 is a two-part arm portion having a first arm section 712 and a second arm section 716. The first arm section 712 and the second arm section 716 are attached together by spring-loaded hinge 732. The hinge 732 allows the second arm section 716 to pivot relative to the first arm section 712. When the safety device 700 is pivoted from a non-deployed state to a deployed state, the arm portion 708 swings outward away from the side of a bus. If an object such as a car, another bus, or a person is within the trajectory of the pivoting safety device 700, a distal end 724 or some portion of the second arm section 716 of the safety device 700 will contact the object. This may cause injury or damage to the safety device 700, object, or person. The hinge 732 is able to prevent or reduce such damage or injury by allowing the second arm portion 716 to pivot backwards, away from the direction of pivot of the safety device 700 relative to the school bus, when the safety device 700 is deployed and contacts an object. This allows for the second arm section 716 to fold backwards and to prevent or reduce damage or injury. In some embodiments, the hinge 732 is spring-loaded to keep the first arm portion 712 and the second arm portion 716 in line with each other until the force of the second arm portion 712 overcomes a spring loaded tension of hinge 732, at which point hinge 732 moves thereby pivoting the second arm section to reduce the impact on an object or person. In some embodiments, the hinge 732 is spring loaded so that once the second section 716 of arm portion 708 is no longer in contact with an object or person, a spring loaded tension of hinge 732 forces the realignment of the first arm section 712 with the second arm section 716. In some embodiments, the hinge 732 may be spring-loaded in two directions. In that case, impact or retraction of the arm may also be accounted for.

It should be understood that while the safety device 700 with the hinge 732 is described as a variation of the safety device 400, any of the arm portions of the herein described embodiments of safety devices may be modified to so that the arm portion is a multi-piece arm portion with one or more hinged connections to provide the advantages described above. Furthermore, it should be understood that other modifications to the arm portion of a safety device as described herein, may be applied to the arm 708 of safety device 732. For example, weight reduction cutouts and additional STOP signs may be added, as described in relation to other embodiments herein.

The safety device 700 also has notches 728 cut out from the distal end 724 of the arm 708. The notches 728 are sized and configured to receive lights (not shown) that are mounted on the distal end 724 of arm 708 or wrapped around notches 728. In some embodiments, the lights have a mounting surface that conforms to the shape of the distal end 724 of arm 708.

Figure 22:
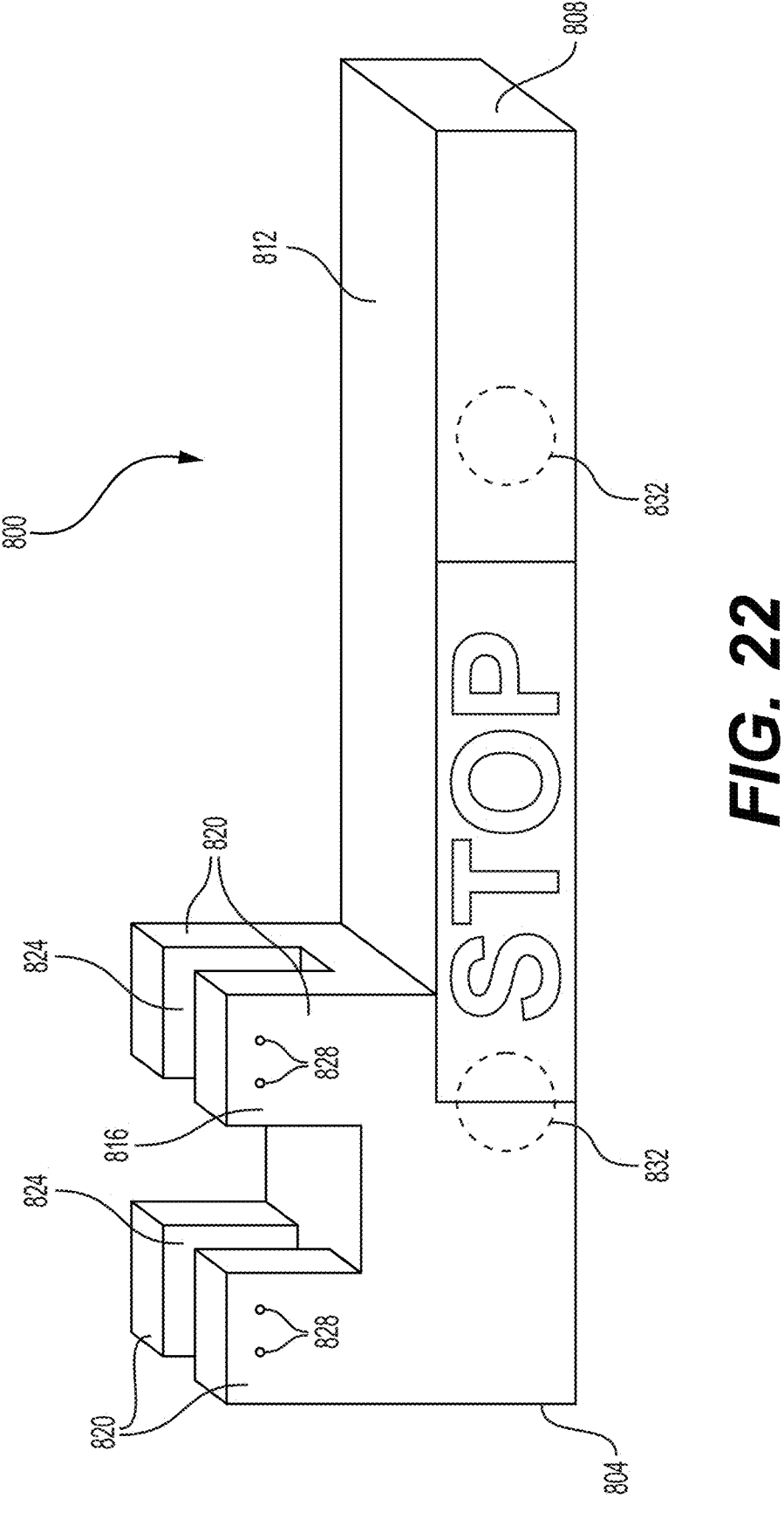
FIG. 22 is an illustrative embodiment of a clear or translucent backlit safety device.

Now primarily referring to FIG. 22, another embodiment of a safety device 800 is shown. The safety device 800 is a retrofit safety device that is intended to be attached to an existing pivoting stop sign (104 in FIG. 1) attached to a school bus. The safety device 800 has a proximate end 804 and a distal end 808. The safety device 800 has an arm portion 812 and a bracket portion 816. The bracket portion 816 is located near the proximate end 804 of the safety arm 800. The bracket portion 816 is formed with bracket tabs 820 which extend upward from the arm portion 812 to form a slot 824 as mounting locations for attachment of the safety device 800 to a stop sign. The slot 824 is formed so as to receive the lower edge of a stop sign. The safety device 800 is attached to the stop sign with bolts or screws or other fasteners through mounting holes 828.

The safety device 800 is made of a clear or translucent material such as plastic. The front of arm portion may have the word "STOP" or other visual indicia on the front or back of the arm portion. The safety device 800 further has integral lights 832 within the arm portion 812 so that when the lighting is activated, the word "STOP" or other visual indicia is back lit to provide visibility to drivers. In the alternative, the word "STOP" may be formed of lights that activate when the safety device 800 is deployed so that drivers approaching the school bus from the front and the back can see the word "STOP."

Figure 23:
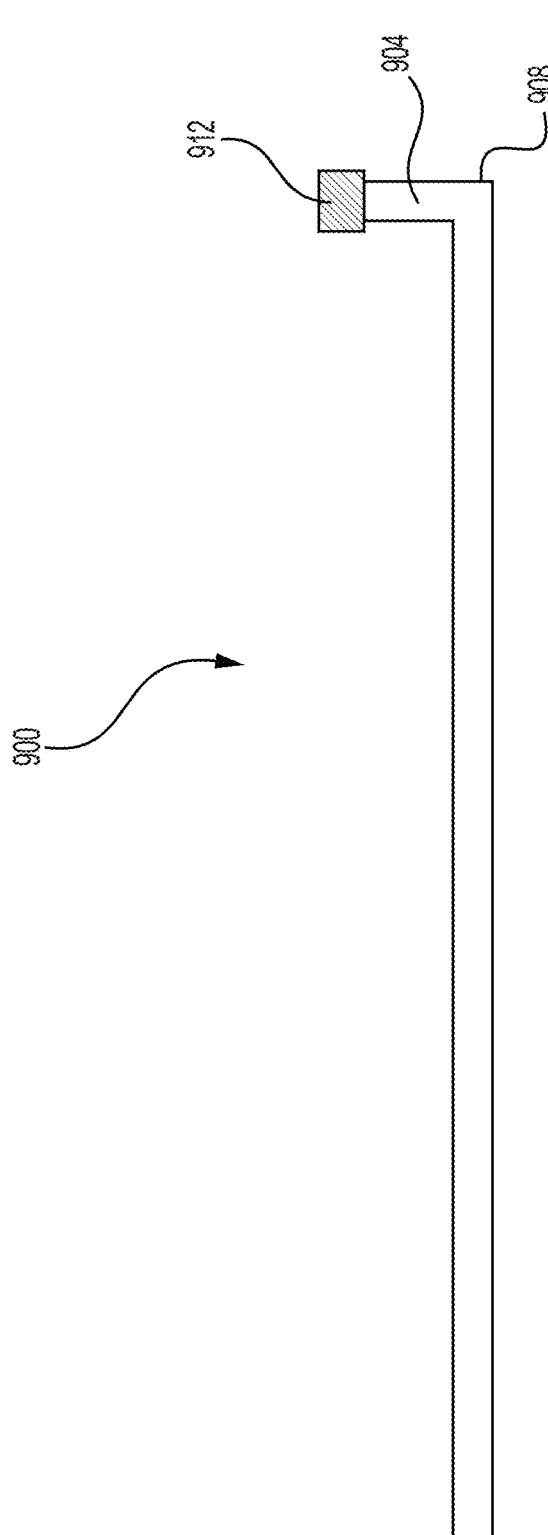
FIG. 23 is an illustrative embodiment of an arm of a safety device having a tab.

Referring now primarily to FIG. 23, which depicts a modification to the arm portion of the above-described embodiments of safety devices. In this modification, arm portion 900 may be cut from a single sheet of material, as described in relation to some embodiments above. However, in this variation of the arm portion 900, the arm portion 900 is formed with an additional tab 904 at the distal end 908 of the arm portion 900. The distal end 908 of arm portion 900 being the end that is further from a school bus when the safety device is deployed. The tab 904, prior to installation on a school bus, is bent backwards at approximately 90 degrees to the remainder of arm portion 900, as shown in FIG. 23, so that when the safety device is installed on a bus and is in the non-deployed state, the remainder of arm portion is primarily parallel to the side of the school bus and the tab 904 extends perpendicular toward that side of the school bus. In this configuration, the tab 904 prevents the distal end 908 of the arm portion 900 from slapping into the side of the bus and therefore causing damages to the arm portion 900 or to the school bus. In some embodiments, tab portion 904 is covered with a rubber bumper 912 to further reduce damage to the arm portion 900 or the school bus.

Figure 24:
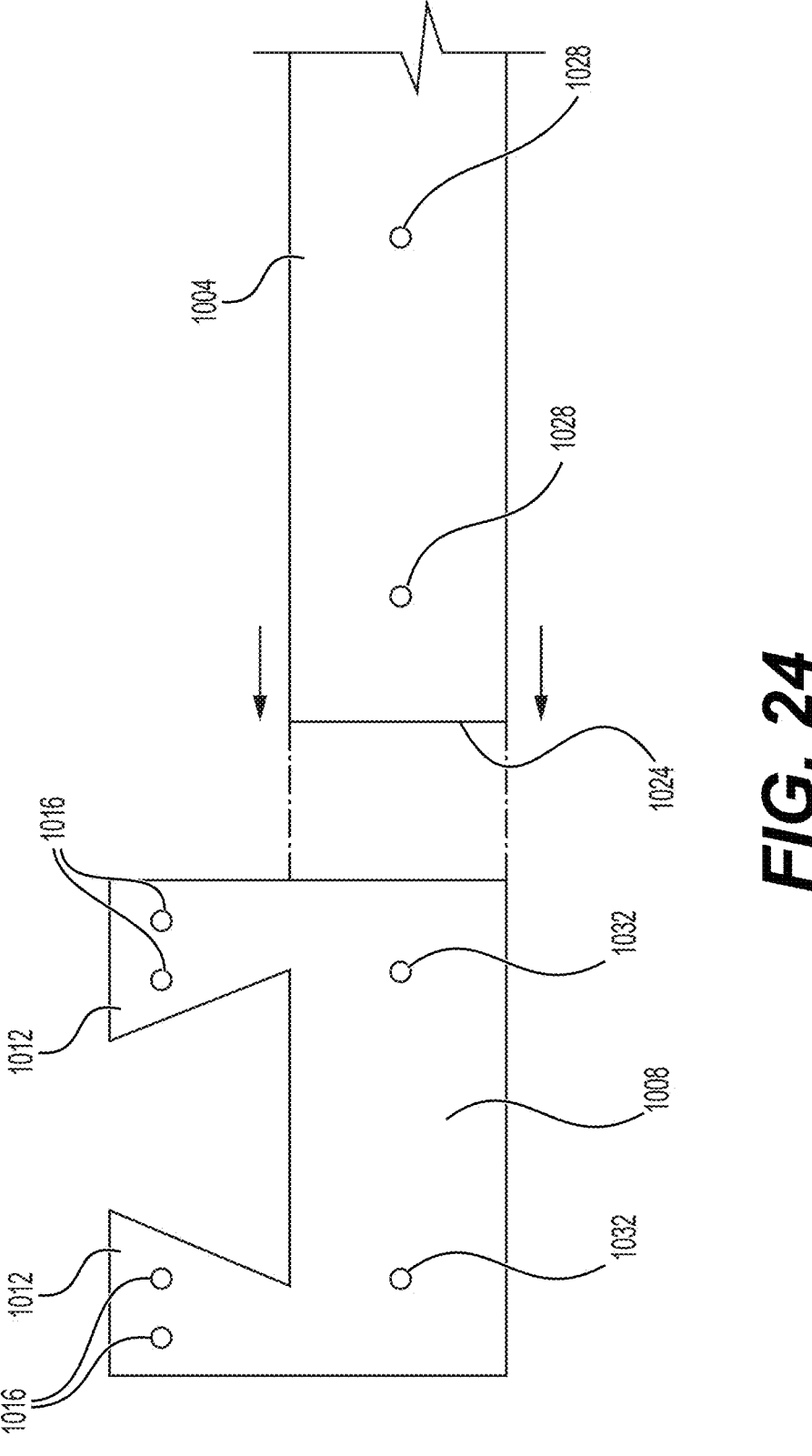
FIG. 24 is an illustrative embodiment of a safety device having slotted bracket for receiving an arm.
Figure 25:
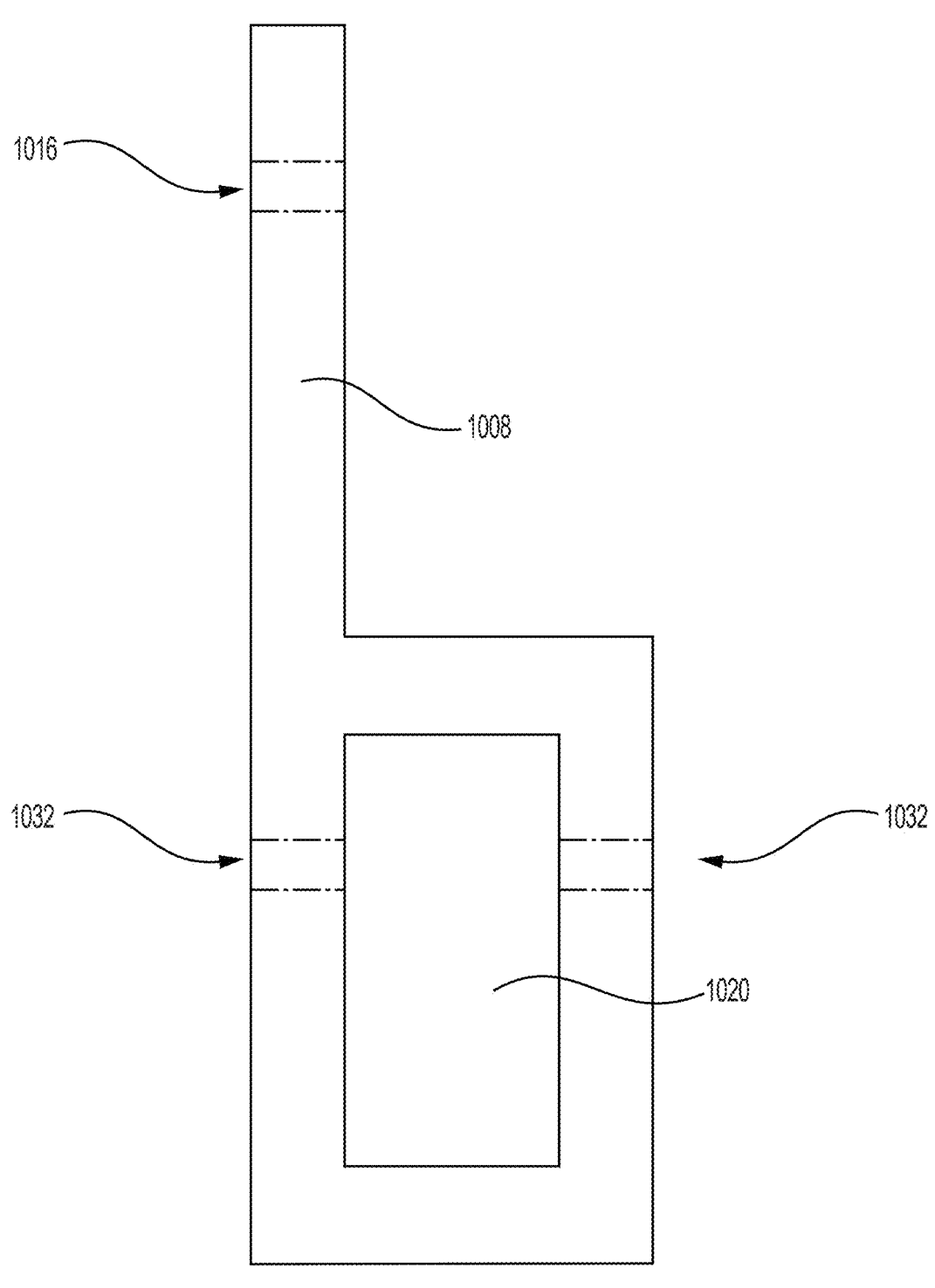
FIG. 25 is a is a schematic end-view of the bracket of FIG. 24.

Referring now primarily to FIGS. 24 and 25, an alternative embodiment of a safety device is depicted. This alternative embodiment provides the ability to temporarily remove the arm portion 1004 of a safety device when it is not needed and to easily reattach the arm portion 1004 when it is needed. This variation of the safety device may be applied to and incorporated into many of the above-described safety devices. In this variation, the arm portion 1004 is designed to be slidably received into a bracket portion 1008 of a safety device. The bracket portion 1008 has mounting ears 1012, which are the same as described in relation to the mounting ears 528 of the safety device 500 of FIG. 19 described above. The mounting ears 1012 are designed to receive and mount to a pivoting stop sign on a school bus. The mounting bracket is mounted to the stop sign with bolts or screws or other fasteners through mounting holes 1016. The mounting bracket 1008 has slot 1020, which is designed and configured to receive the proximate end 1024 of arm portion 1004, so that the arm portion 1004 slides into the slot 1020 and mounting holes 1028 of the arm portion 1004 align with mounting holes 1032 of the bracket portion 1008. The bracket portion 1008 is attached to the arm portion 1004 with bolts or screws or other fasteners through the mounting holes 1028, 1032. Alternatively, quick release pins or connectors may be used to affix the arm portion 1004 to the bracket portion 1008, to facilitate the quick disassembly and reassembly of the arm portion 1004 and bracket portion 1008.

In another illustrative embodiment, the sign and arm are formed using a one-piece transparent or translucent material. In this case, the stop sign is also translucent. In another illustrative embodiment, the arm that extends beyond the stop sign is attached using strong magnets where the stop sign is metal. The ears on the bracket can have a magnetic field rather than bolts. This makes for easier installation and the ability to move it to other buses quickly.

Figure 26:
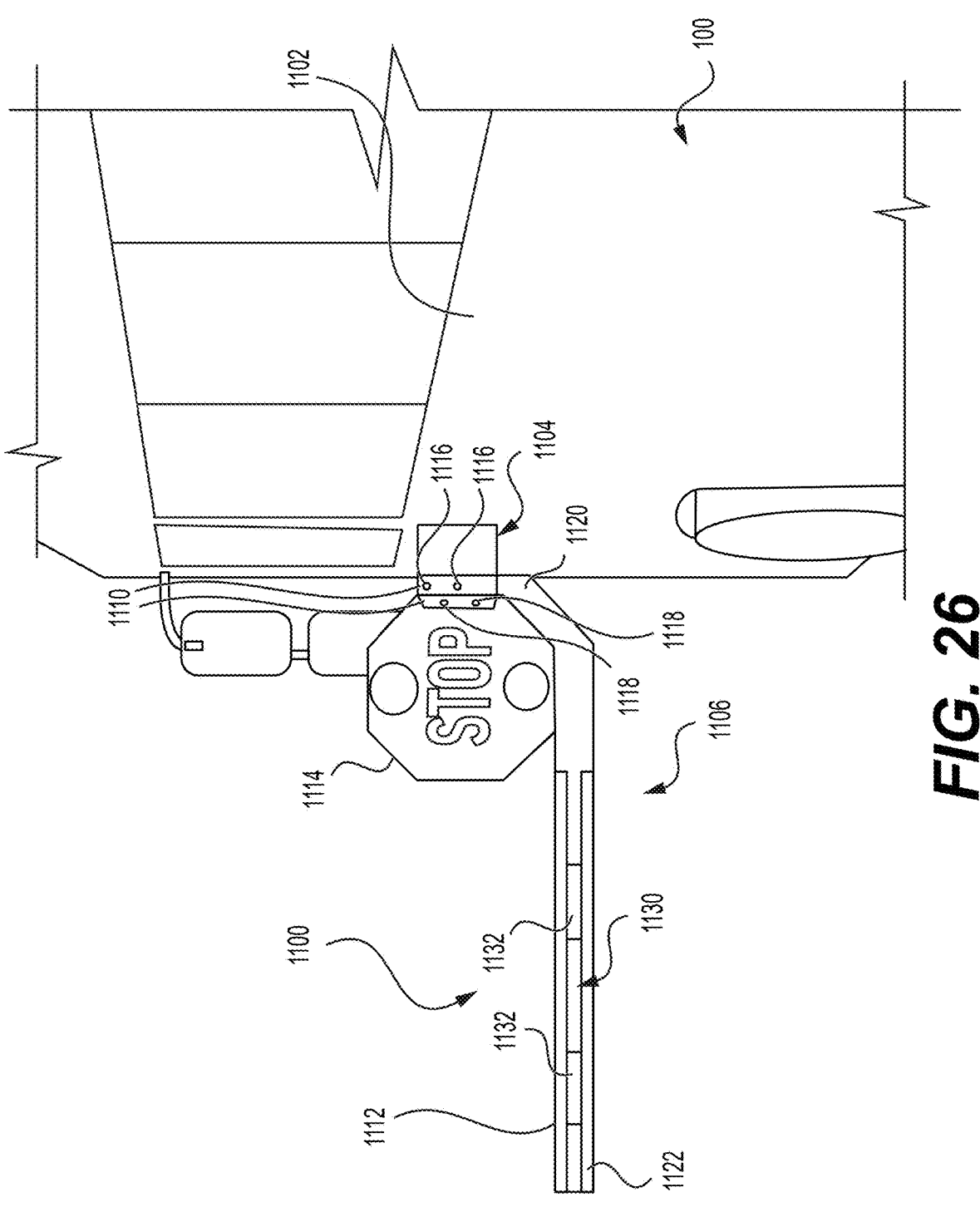
FIG. 26 is a schematic diagram of a bus having a safety device mounted thereon in a deployed position.

Referring now primarily to FIGS. 26-29, and initially to FIG. 26, another illustrative embodiment of a safety device 1100 is presented. The safety device 1100 may be installed by an original manufacturer or may be a retrofit. The safety device 1100 is configured to be attached to an exterior side 1102 of the school bus 100. The safety device 1100 includes a mounting bracket 1110 and includes an arm portion 1112. The safety device 1100 may also include a stop sign portion 1114. In some embodiments, the safety device 1100 further includes a mounting motor 1104 or couples thereto. The mounting bracket 1110 is coupled to the mounting motor 1104, which is attached to the school bus 100 for moving the arm portion 1112 and the stop sign portion 1114 between a deployed (open or extended) position 1106 (illustrated in FIG. 26) and an undeployed (closed) position 1108 (illustrated in FIG. 28). When the bus operator chooses to deploy the arm portion 1112, the motor of the mounting motor 1104 is energized to move the mounting bracket 110 and concomitantly the arm portion 1112 outward. The embodiments of FIGS. 26-29 may be applied or incorporated into any of the above-described safety devices (FIGS. 1-15).

Figure 27:
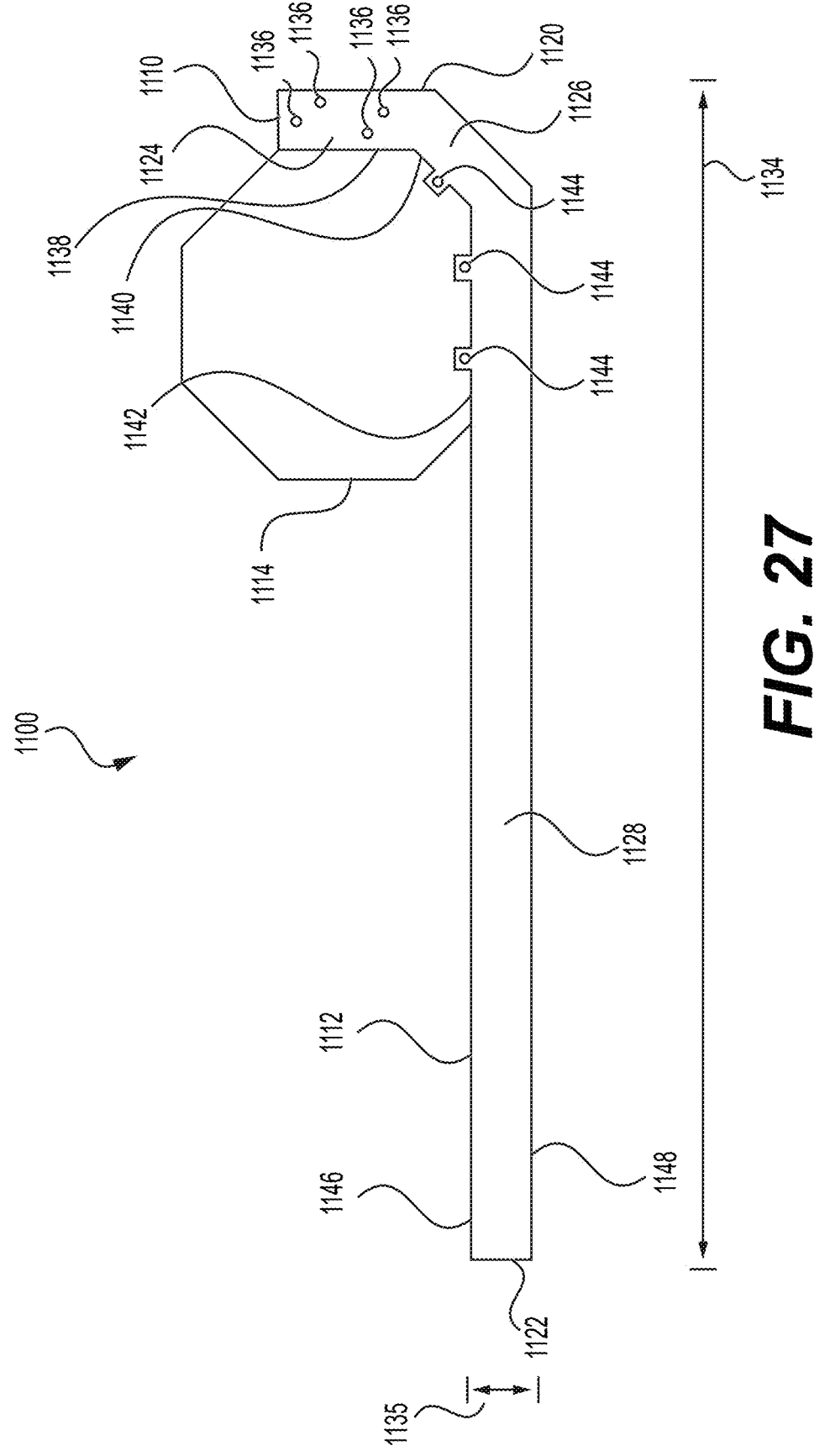
FIG. 27 is an illustrative embodiment of a safety device having an arm portion and a stop sign portion.

Referring now primarily to FIG. 27, another illustrative embodiment of the safety device 1100 is presented. The safety device 1100 includes the mounting bracket 1110 coupled to an arm portion 1112. As previously noted the mounting bracket 1110 couples directly to the mounting motor 1104 or any other means of moving the safety device 1100 between an undeployed and deployed position. The mounting bracket 1110 may also be coupled to the stop sign portion 1114 for stability.

In some embodiments, the mounting bracket 1110 is directly coupled to the mounting motor 1104, with the mounting motor 1104 being directly connected to the school bus 100. In some embodiments, the mounting bracket 1110 is metal, e.g., steel or aluminum. In yet some embodiments, the mounting bracket 1110 is plastic. The mounting bracket 1110 includes a plurality of openings or apertures 1136 (see, e.g., FIG. 27) for receiving fasteners for attaching the mounting bracket 110 to the mounting motor 1104 (FIG. 26). As can be seen in FIG. 26, a first plurality of fasteners 1116 may be used in conjunction with openings 1136 to couple the mounting bracket 1110. The mounting bracket 1110 or a portion of the arm portion 1112 of the safety device 1100 may be formed with a second plurality of openings or apertures 1144. The second openings 1144 in conjunction with a second plurality of fasteners 1118 may couple the stop sign portion 1114 and the mounting brack 1110 or arm portion 1112. In some embodiments, the second plurality of fasteners 1118 may couple both the arm portion 1112 and the stop sign portion 1114 to the mounting bracket 1110.

The safety device 1100 has a proximal end 1120 and a distal end 1122, with the proximal end 1120 forming the mounting bracket 1110 and the distal end 1122 being part of the arm portion 1112. The safety device 1100 further includes a first segment 1124, which is the mounting bracket 1110, a second segment 1126, and a third segment 1128, which is the arm portion 1112). The first 1124 and third segment 1128 are perpendicular to each other, and the second segment 1126 connects the first and second segments 1124, 1128. The second segment 1126 is angled relative to both the first and third segments 1124, 1128. The stop sign portion 1114 typically has an octagonal shape. In some embodiments, the first segment 1124 aligns with apportion of the stop sign 1114, and the second segment 1126 also aligns with a portion of the stop sign 1114 as does a portion of the third segment 1128; said another way, the first, second, and third segments 1124, 1126, 1128 of the arm portion 1112 coincide with a first, second and third side 1138, 1140, 1142 of the stop sign portion 1114.

In some embodiments, the safety device 1100 includes a plurality of tabs 1144 that overlap the stop sign portion 1114 along at least one side of the stop sign portion 1144. In one aspect, the plurality of tabs 1144 extend from the third segment 1128 of the arm portion 1112 and overlap the third side 1142 of the stop sign portion 1114. In another aspect, the plurality of tabs 1144 extend from the second and third segments 1126, 1128 of the arm portion 1112 and overlap the second and third sides 1140, 1142 of the stop sign portion 1114, respectively. In some embodiments, the plurality of tabs 1144 are fastened to the stop sign portion 1114. The plurality of tabs 1144 may be the only part of the safety device 1100 that overlaps the stop sign portion 1114. The plurality of tabs 1144 may help keep the stop sign portion 1114 against the safety device 1100, for example, when the safety device 1100 is moved between the undeployed position 1108 and the deployed position 1106, when the safety device 1100 is in the undeployed position 1108 and the bus 102 is in motion, and when the safety device 1100 is in the deployed position 1106 and it is windy.

The arm portion 1112 further includes an interior portion 1130 (FIG. 26). In some aspects, the interior portion 1130 of the arm portion 1112 may have lights or reflectors 1132 and may also have weight-reducing cutouts. The arm portion 1112 may be formed of aluminum, but in other embodiments, may be formed of polycarbonate. As shown in FIG. 27, the safety device 1100 has a longitudinal length 1134 that is greater than two feet. The longitudinal length 1134 extends from the proximal end 1120 to the distal end 1122. The arm portion 11112 may have a width 1135 of 2-8 inches or any dimension in that range.

Figures 28, 29:
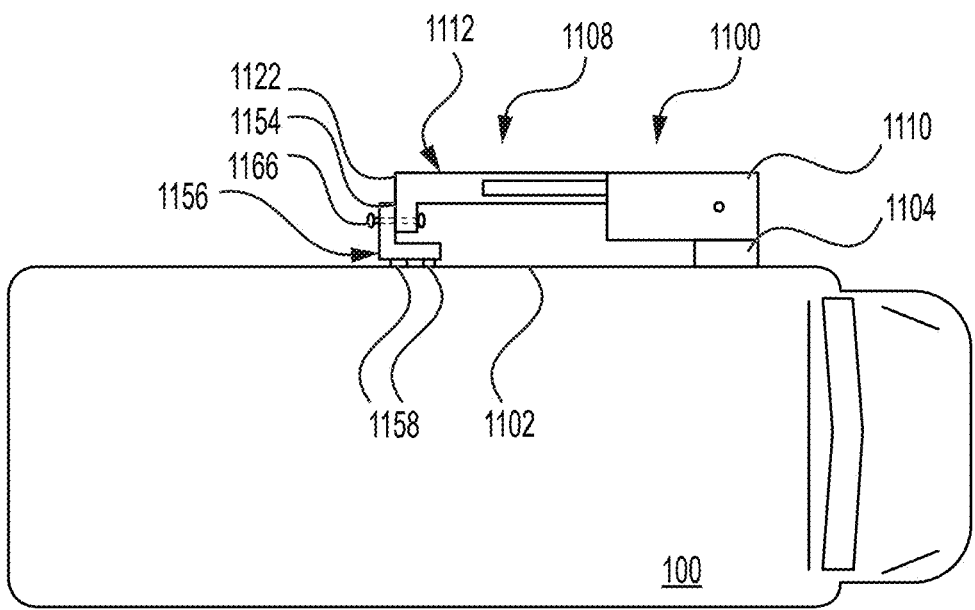
FIG. 28 is a schematic, top-view diagram of a bus having a safety device mounted thereon in a undeployed position with an adjustable, magnetic stopper positioned adjacent to a side of the bus.
FIG. 29 is a detailed view of an illustrative embodiment of an adjustable, magnetic stopper attached to an arm portion.

Referring now primarily to FIGS. 28 and 29, with continued reference to FIGS. 26 and 27, the safety device 1100 is further described. It should be appreciated that the top view of the safety device 1100 shown in FIG. 28 is exaggerated in scale relative to the school bus 100 for clarity in explaining certain aspects.

The arm portion 1112 further includes a top edge 1146 and a bottom edge 1148. The bottom edge 1148 includes a lip 1150 that extends outward therefrom a lip length 1152. In some aspects, the lip 1150 is only on the third segment 1128 of the arm portion 1112. The lip 1150 may provide additional structural stability to the arm portion 1112 against bending and torsional moments. In some embodiments, the lip length 1152 extends outward 0.25 inches. In yet some embodiments, the lip length 1152 extends outward 1 inch. Those skilled in the art will appreciate that the lip 1150 may be sized accordingly to provide stability based on the width, w, and the length 1134 of the arm portion 1112.

In some embodiments, the arm portion 1112 further includes a stopper tab 1154 extending from a portion of the distal end 1122 with an adjustable stopper bracket 1156 coupled to the stopper tab 1154. The adjustable stopper bracket 1156 includes a first arm 1160 and a second arm 1162. The first arm 1160 is connected to the stopper tab 1154. The second arm 1162 extends perpendicular to the first arm 1160, and is parallel to the arm portion 1112. The adjustable stopper bracket 1156 is configured such that the second arm 1162 contacts the school bus 100 (or stoppers or magnets 1158 thereon do) when the safety device 1100 is in the undeployed position 1108.

The second arm 1162 of the adjustable stopper bracket 1156 includes one or more magnets 1158. The magnets 1158 help hold the safety device 1100 against the exterior side 1102 of the school bus 100 when in the undeployed position 1108. The adjustable stopper bracket 1156 is adjustable to facilitate contact between the magnet 1158 and the school bus 102. The adjustable stopper bracket 1156 includes a plurality of channels 1164. The plurality of channels 1164 allow the adjustable stopper bracket 1156 to slide relative to the stopper tab 1154. The stopper tab 1154 has openings (not explicitly shown) formed therein that correspond to each of the plurality of channels 1164. Fasteners 166 extend through the plurality of channels 1164 and a corresponding opening in the stopper tab 1154 to secure the stopper tab 1154 and first arm 1160. In application, once the appropriate distance is gaged, such that the second arm 1162 (and magnets 1158) of the adjustable stopper bracket 1156 connects with the side 1102 of the school bus 100 when in the undeployed position 1108, the fasteners 1166 may be tightened to hold the adjustable stopper bracket 1156 in place relative to the stopper tab 1154 of the arm portion 1112.

Figure 30:
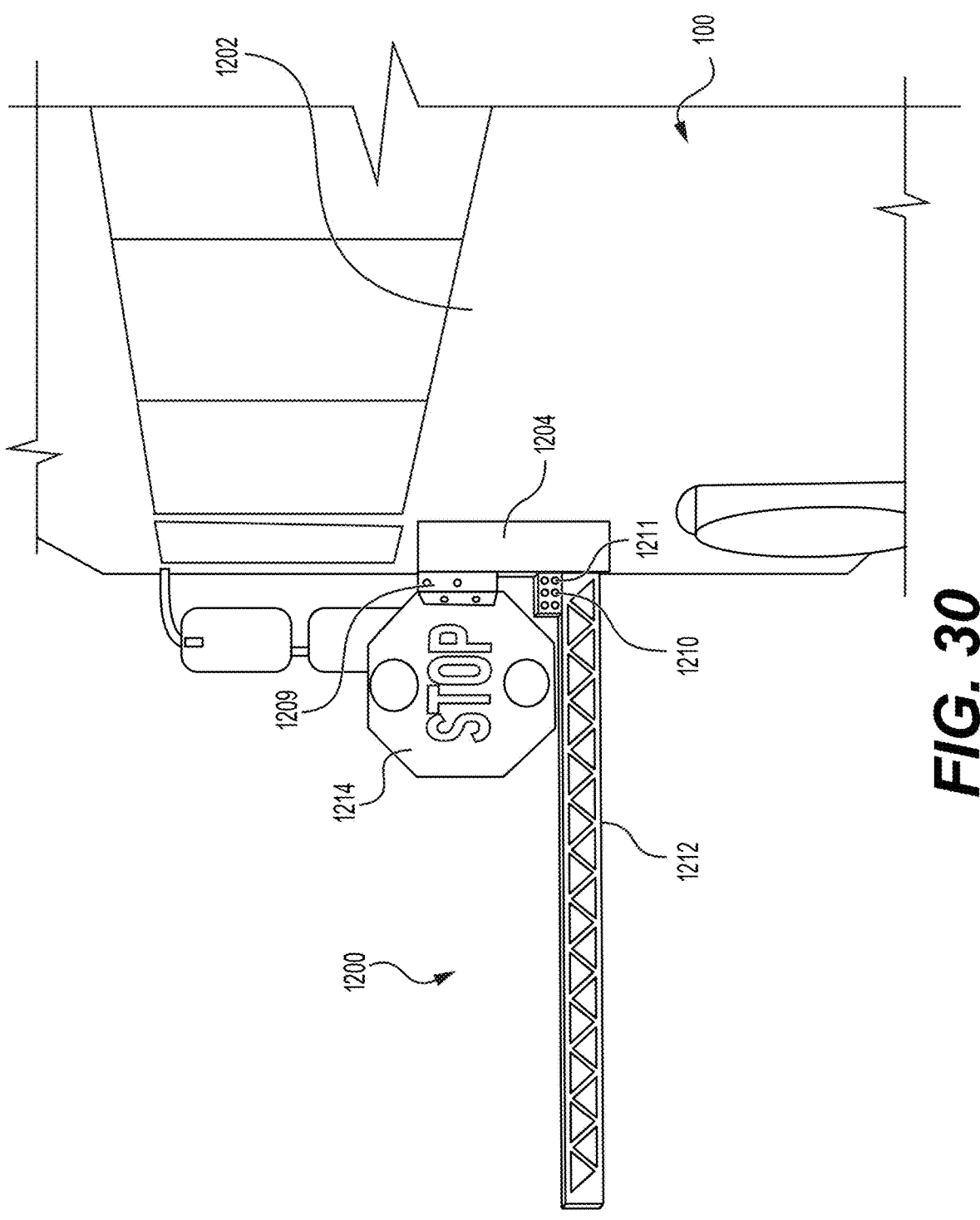
FIG. 30 is a schematic perspective view of a portion of a bus having an illustrative embodiment of a safety device mounted thereon in a deployed position, the safety device having an arm portion and a stop sign portion.
Figure 31:
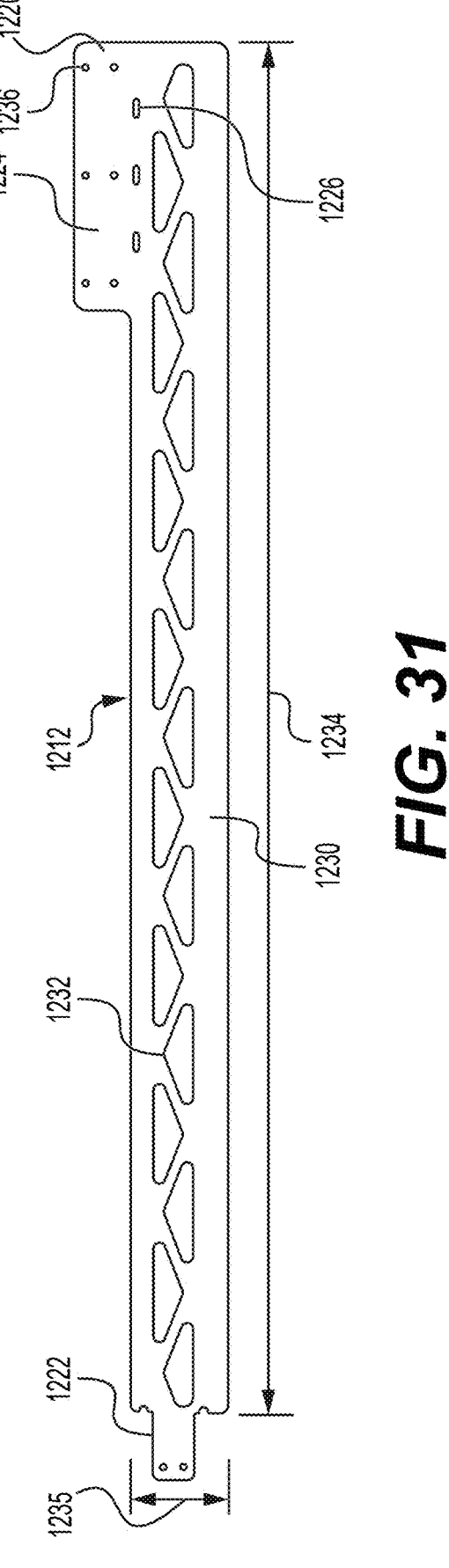
FIG. 31 is a schematic elevation view of the arm portion of FIG. 30.

Referring now to FIGS. 30-31, another illustrative embodiment of a safety device 1200 is presented. The safety device 1200 may be installed by an original manufacturer or may be a retrofit. The safety device 1200 is configured to be attached to an exterior side 1202 of the school bus 100. The safety device 1200 includes a first mounting bracket 1209 attached to a stop sign portion 1214 and a second mounting bracket 1210 attached to an arm portion 1212. In some embodiments, the safety device 1200 further includes a mounting motor 1204. The mounting motor 1204 is coupled to the first mounting bracket 1209 and the second mounting bracket 1210. The mounting motor 1204 is attached to the school bus 100 for moving the arm portion 1212 and the stop sign portion 1214 between a deployed (open or extended) position (as shown in FIG. 30) and an undeployed (closed) position. The arm portion 1212 and the stop sign portion 1214 may be moved concomitantly or independently.

When the bus operator chooses to deploy the arm portion 1212, the motor of the mounting motor 1204 is energized to move the second mounting bracket 1210 and concomitantly the arm portion 1212 outward. Likewise, when the bus operator chooses to deploy the stop sign portion 1214, the motor of the mounting motor 1204 is energized to move the first mounting bracket 1209 and concomitantly the stop sign portion 1214. As previously mentioned, the motor of the mounting motor 1204 may move the first mounting bracket 1209 separately from the second mounting bracket 1210 such that the stop sign portion 1214 and the arm portion 1212 may be moved independently.

In some embodiments, the first mounting bracket 1209 is directly coupled to the mounting motor 1204, with the mounting motor 1204 being directly connected to the school bus 100. In some aspects, the first mounting bracket 1209 is metal, e.g., steel or aluminum. In other aspects, the first mounting bracket 1209 is plastic or a polymer material that is transparent or translucent.

In some embodiments, the second mounting bracket 1210 is directly coupled to the mounting motor 1204, with the mounting motor 1204 being directly connected to the school bus 100. In some aspects, the second mounting bracket 1210 is metal, e.g., steel or aluminum. In other aspects, the second mounting bracket 1210 is plastic or a polymer material that is transparent or translucent.

Referring now primarily to FIG. 31, with continued reference also to FIG. 30, the arm portion 1212 further includes a tab 1224 for attaching to the second mounting bracket 1210. The tab 1224 includes a plurality of opening or apertures 1236 for receiving fasteners 1211 for attaching the arm portion 1212 to the second mounting bracket 1210.

The arm portion 1212 further includes break-away slots 1226 (3 are shown but it could be more or less) positioned beneath the plurality of openings 1236. The break-away slots 1226 are a safety mechanism that allows the arm portion 1212 to break away from the school bus to help prevent injury to another vehicle, person, or object in the trajectory of the arm portion 1212. The break-away slots 1226 may also help minimize damage to the safety device 1200 and the school bus 100.

The arm portion 1212 further includes an interior portion 1230. In some aspects, the interior portion 1230 of the arm portion 1212 may have lights or reflectors (not shown) and may also have weight-reducing cutouts 1232. The arm portion 1212 may be formed of aluminum, but in other embodiments, may be formed of polycarbonate, plastic or polymer material and may have portions that are transparent or translucent. In some embodiments, the safety device 1200 has a longitudinal length 1234 that is greater than two feet. In yet some embodiments, the longitudinal length 1234 is between two feet and six feet. The longitudinal length 1234 extends from a proximal end 1220 to a distal end 1222. The arm portion 1212 may have a width 1235 of 2-8 inches or any dimension in that range. In still other embodiments, different dimensions may be used. The distal end 1222 may include a stopper tab (not shown but analagous to the stopper tab 1154 illustrated in FIGS. 28-29) extending therefrom to help hold the safety device 1200 against the side of the school bus.

The embodiments of FIGS. 30-31 may be applied or incorporated into any of the herein described safety devices.

Figure 32:
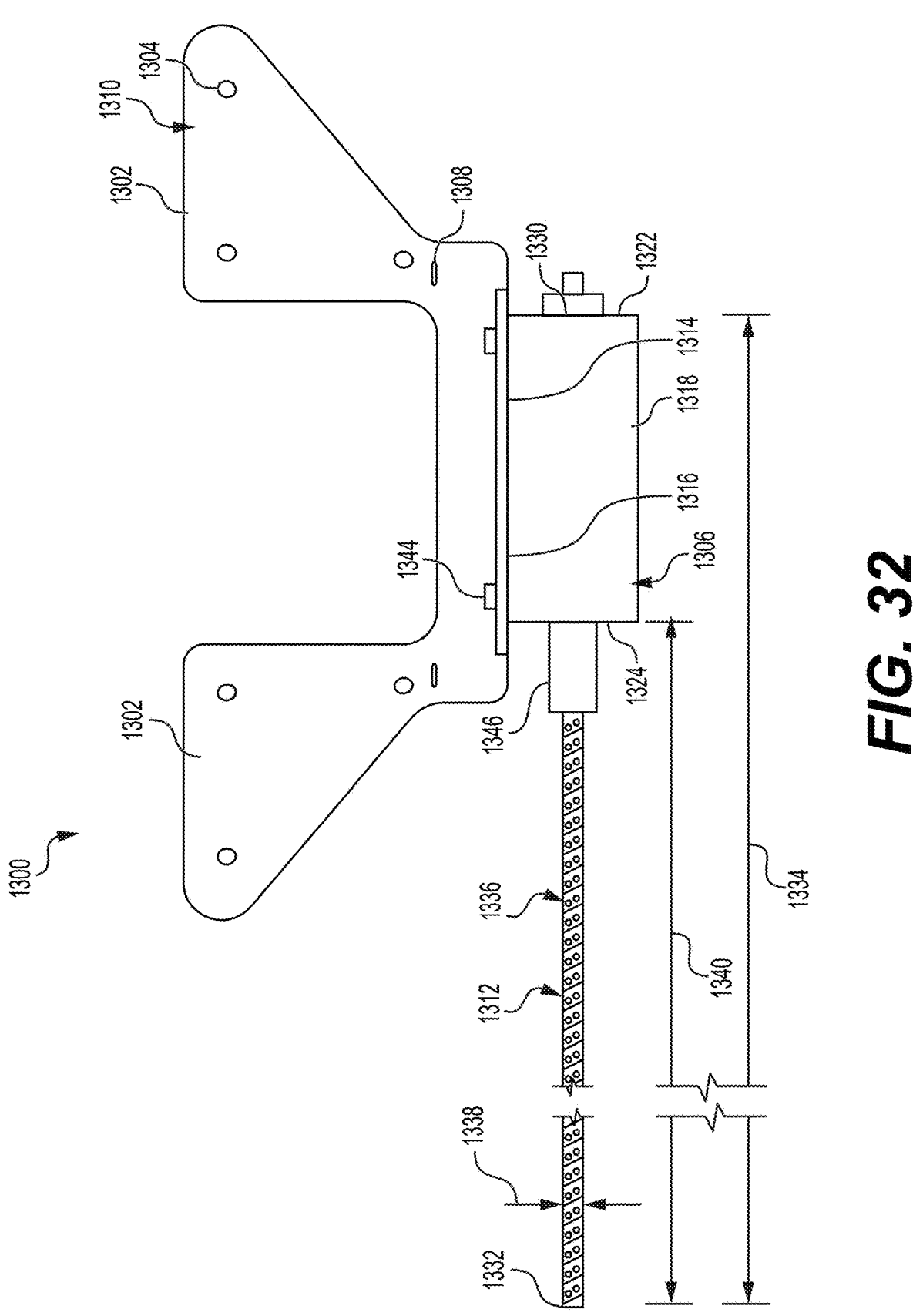
FIG. 32 is a schematic top view of an illustrative embodiment of a safety device having a mounting bracket, a housing bracket, and an arm portion.
Figure 33:
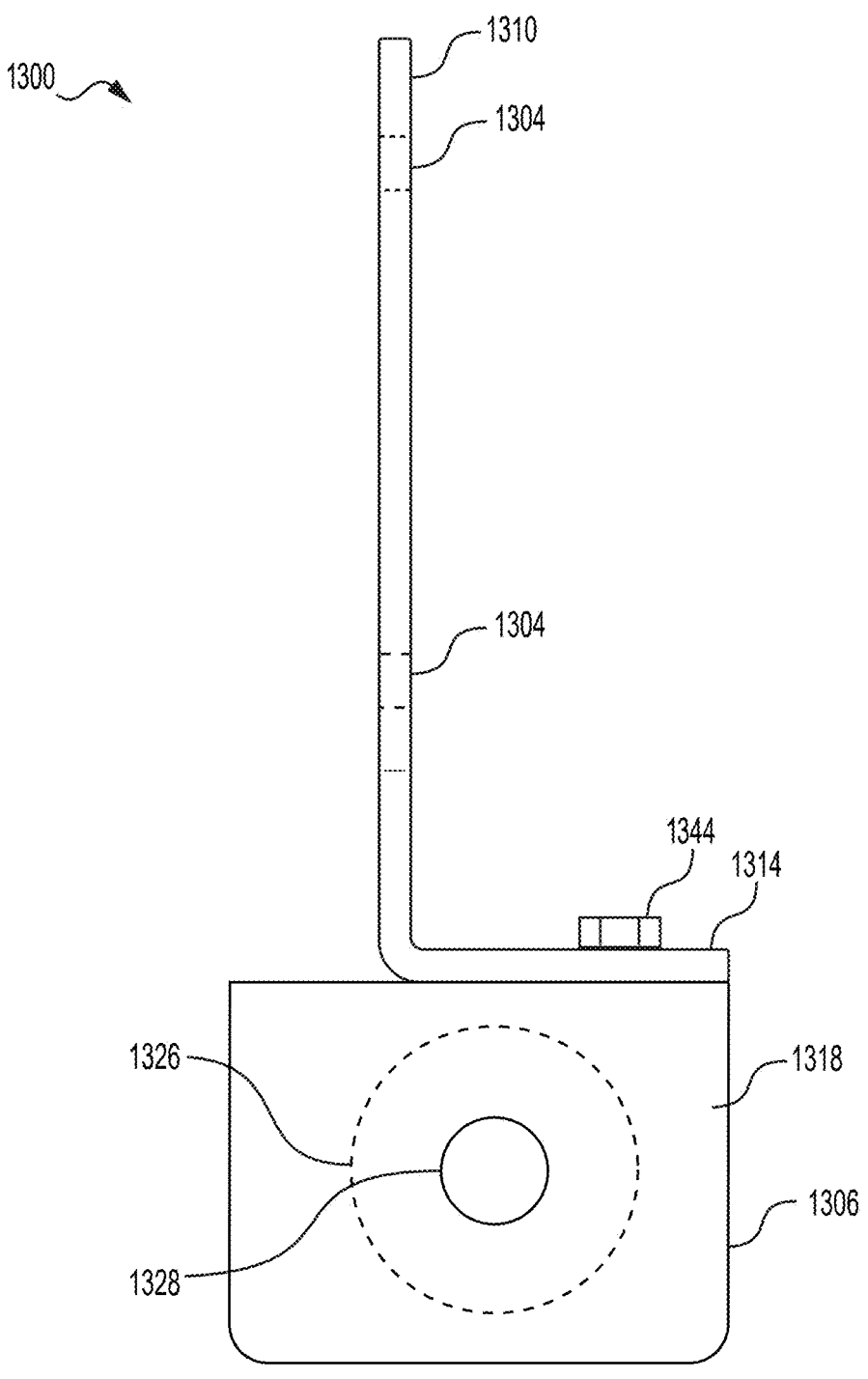
FIG. 33 is a schematic, side elevation view of the mounting bracket and the housing bracket of FIG. 32.
Figure 34:
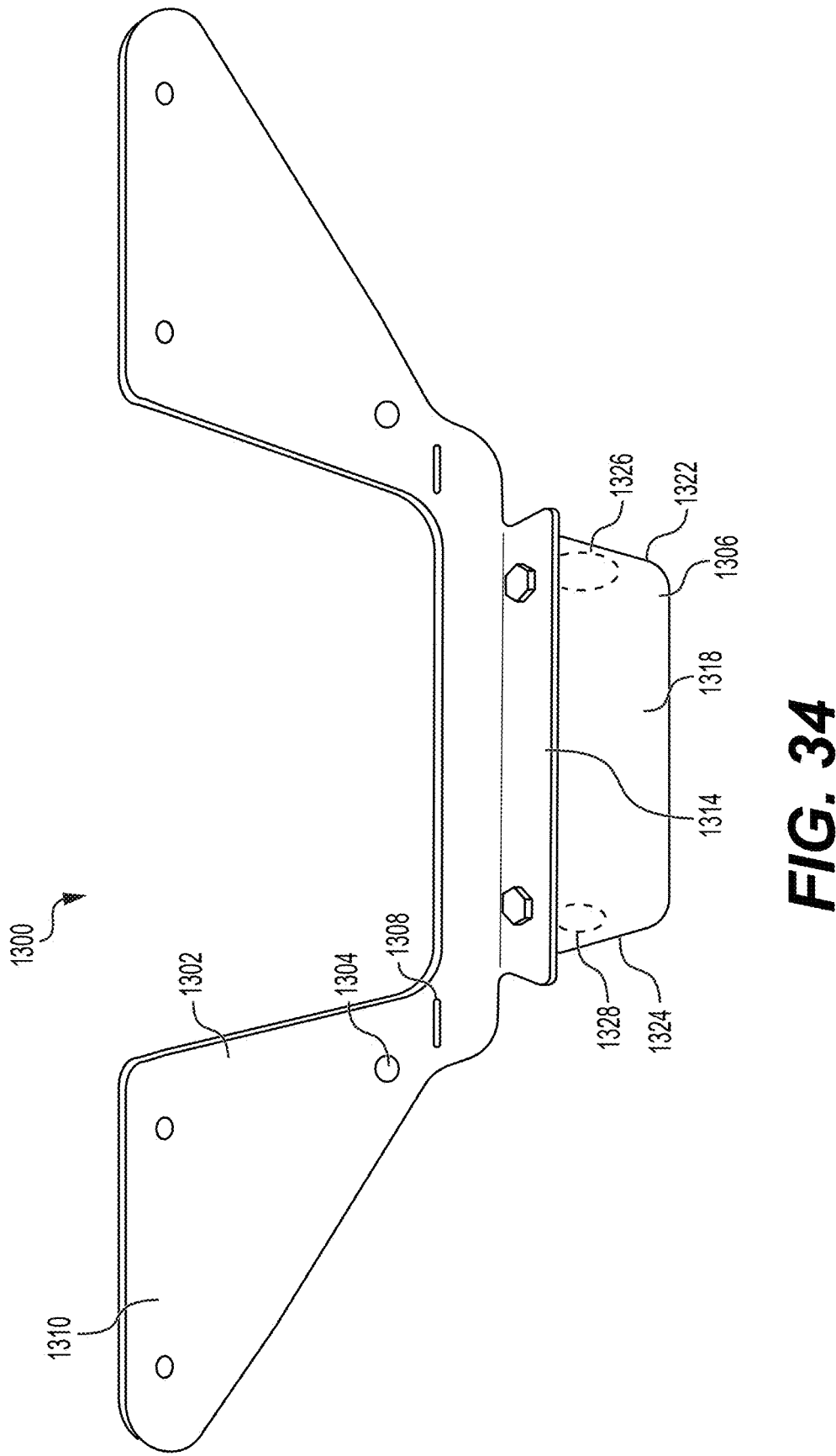
FIG. 34 is a schematic, perspective-view of the mounting bracket and the housing bracket of FIG. 32.

Referring now primarily to FIGS. 32-34, another illustrative embodiment of a safety device 1300 is presented. The safety device 1300 may be installed by an original manufacturer or may be a retrofit. The safety device 1300 is configured to be attached to an exterior side of the school bus 100 (FIG. 1). The safety device 1300 includes a mounting bracket 1310 for attaching to a stop sign portion (not explicitly shown but analagous to stop signs disclosed herein, e.g. stop sign portion 1214 illustrated in FIG. 31) and a housing bracket 1306 for attaching to a safety arm portion 1312. In some embodiments, the safety device 1300 further includes a mounting motor (not shown but analogous to other mounting motors disclosed herein, e.g., mounting motor 1204 illustrated in FIG. 31). The mounting bracket 1310 is coupled to the mounting motor such that the mounting motor moves the mounting bracket 1310, with attached arm portion 1312, between a deployed (open or extended) position and an undeployed (closed) position.

The mounting bracket 1310 includes one or more mounting ears 1302, having a plurality of openings 1304 formed therein for attaching to a stop sign. In some embodiments, the mounting bracket 1310 further includes one or more break-away slots 1308 beneath the mounting ears 1302 to allow a portion of the safety device 1300 to break-away upon impact. In yet some embodiments, the mounting bracket 1310 includes a bottom ledge 1314 extending at a approximately ninety-degree angle from the one or more mounting ears 1302. The bottom ledge 1314 is configured for attaching to the housing bracket 1306.

In some embodiments, the mounting bracket 1310 is metal, e.g., steel or aluminum. In yet some embodiments, at least some aspects of the mounting bracket 1310 are plastic or a polymer material that is transparent or translucent. In yet some other embodiments, at least some portions of the mounting bracket 1310 comprises a clear polycarbonate material.

The housing bracket 1306 is connected to the mounting bracket 1310 and is configured for receiving a portion of the safety arm 1312. The housing bracket 1306 includes a top portion 1316, a first-longitudinal side 1318, a second-longitudinal side 1320, a first-short side 1322, and a second-short side 1324. The top portion 1316 of the housing bracket 1306 is fastened to the bottom ledge 1314 of the mounting bracket 1310. In some embodiments, the housing bracket 1306 and the mounting bracket 1310 may be fastened to each other using fasteners 1344, such a bolts or screws or rivets.

In some embodiments, the first-short side 1322 of the housing bracket 1306 has a first aperture 1326, and the second-short side 1324 of the housing bracket 1306 has a second aperture 1328. The first aperture 1326 is configured for receiving a first end 1330 of the safety arm 1312 and fastening the first end 1330 of the safety arm 1312 to the housing bracket 1306. The safety arm 1312 extends through the second aperture 1328 of the second-short side 1324 of the housing bracket 1306. The second aperture 1328 may provide support for a cantilevered portion 1346 of the safety arm 1312. In yet some embodiments, the first aperture 1326 is smaller than the second aperture 1328.

The arm portion or safety arm 1312 includes the first or proximal end 1330 and a second or distal end 1332. As previously discussed, the first end 1330 of the safety arm

1312 may be coupled to the first-short side 1322 of the housing bracket 1306. The safety arm 1312 extends the length of the housing bracket 1306, extending through the second aperture 1328 in the second-short side 1324 of the housing bracket 1306, with the second or distal end 1332 of the safety arm 1312 cantilevered from the housing bracket 1306.

In some embodiments, the safety arm 1312 has a longitudinal length 1334 that is greater than two feet. The longitudinal length 1334 extends from the proximal end 1330 to the distal end 1332. In yet some embodiments, the longitudinal length 1334 of the safety arm 1312 is in the range of two feet to six feet. In some aspects, the safety arm 1312 is at least partially formed from a transparent or translucent material. In yet some aspects, the safety arm 1312 is comprised of fiberglass, aluminum, or polycarbonate. Reflective safety tape (not shown) may also be coupled to the safety arm 1312 along the longitudinal length 1334 of the safety arm 1312. The arm portion 1312 may have a width (diameter) 1338 of 2-8 inches or any dimension in that range.

The safety device 1300 may further include a plurality of lights 1336 coupled to the safety arm 1312. In some aspects, the plurality of lights 1336 are LED lights. In yet some aspects, the plurality of lights 1336 are LED lights that are wrapped around the safety arm 1312. The plurality of lights 1336 may be wrapped around seventy-five percent or more of a cantilevered length 1340 of the of the safety arm 1312 that extends outside of the housing bracket 1306.

The embodiments of FIGS. 32-34 may be applied or incorporated into any of the herein described safety devices.

Figure 35:
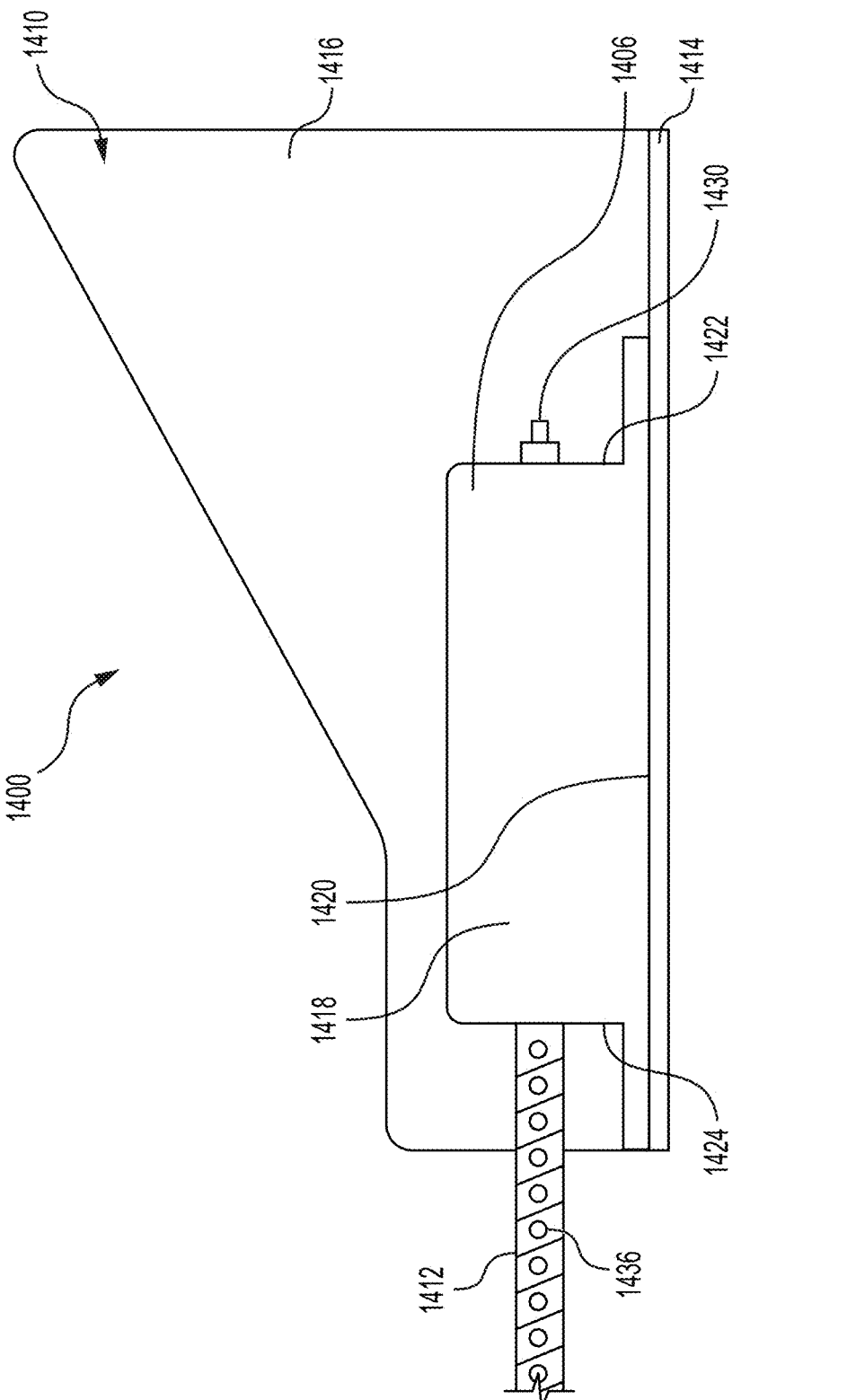
FIG. 35 is a schematic elevation view of an illustrative embodiment of a safety device having a mounting bracket, a housing bracket, and an arm portion.
Figure 36:
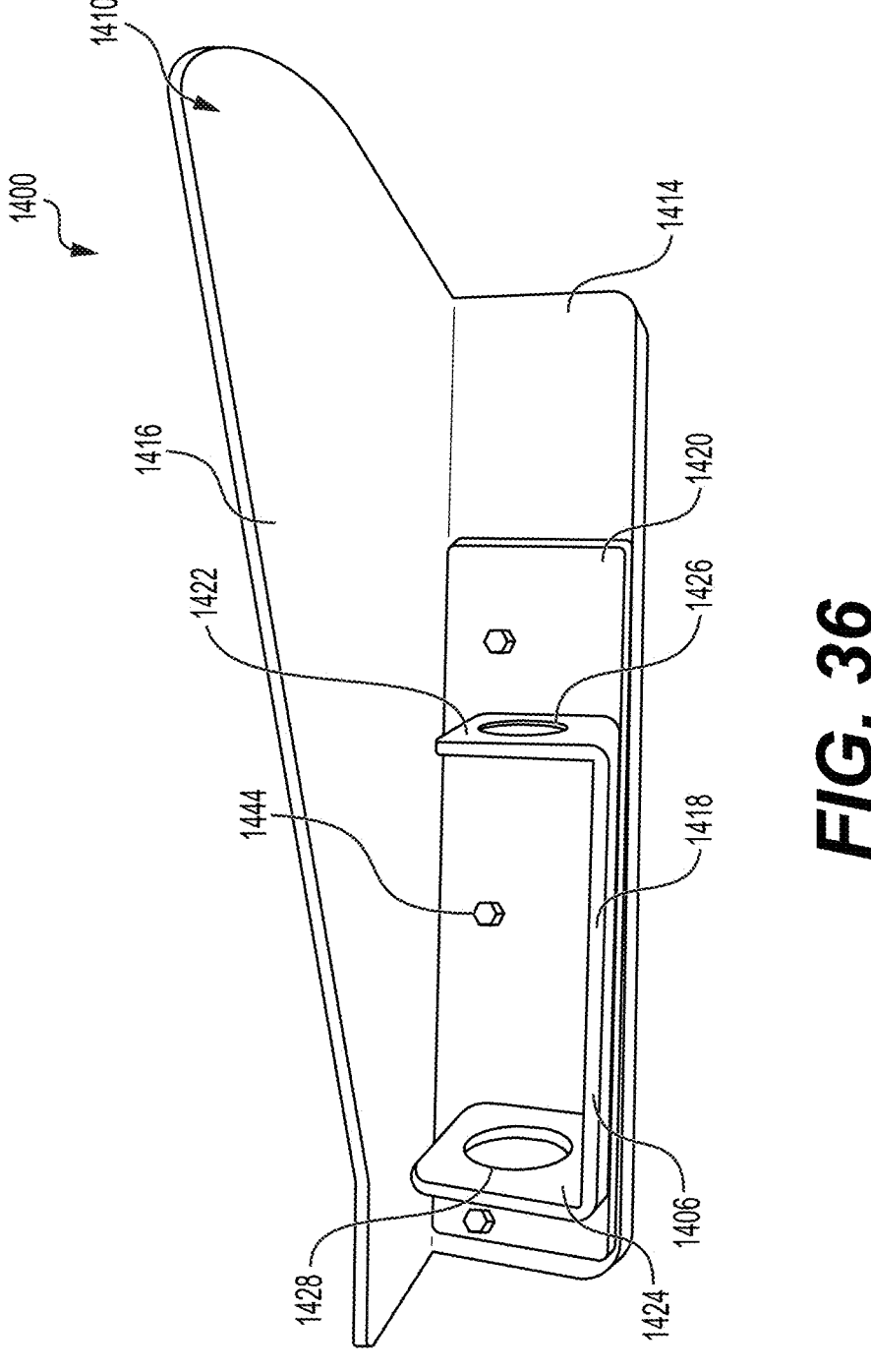
FIG. 36 is a schematic, perspective-view from the top of the mounting bracket and the housing bracket of FIG. 35.
Figure 37:
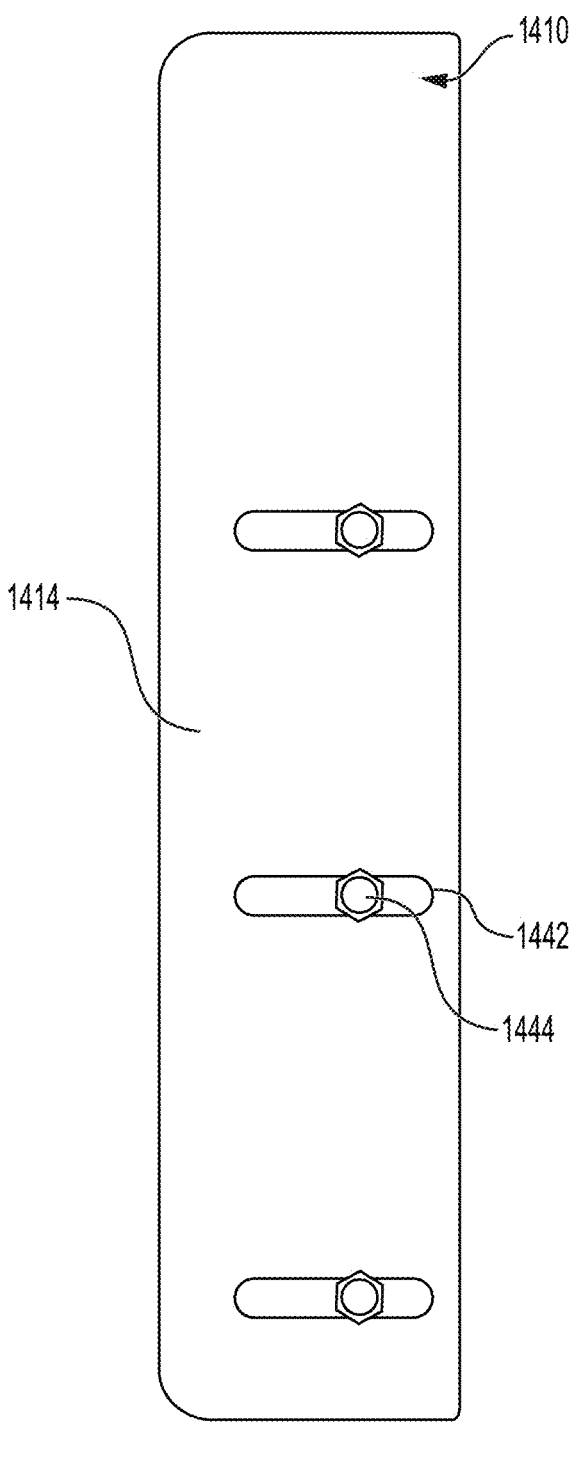
FIG. 37 is a schematic, bottom-view diagram of the mounting bracket of FIG. 35.

Referring now primarily to FIGS. 35-37, another illustrative embodiment of a safety device 1400 is presented. The safety device 1400 may be installed by an original manufacturer or may be a retrofit. The safety device 1400 is configured to be attached to an exterior side of the school bus 100 (e.g., FIG. 1), such as a front bumper on the bus 100. The safety device 1400 includes a mounting bracket 1410, for pivotally attaching to the school bus 100, a housing bracket 1406 attached to the mounting bracket 1410, and a safety arm portion 1412 attached to the housing bracket 1406. The safety arm 1412 may be analogous to arm 1312 or 1212. The safety arm portion 1412 may also be referred to as a crossing arm or crossing gate and may extend in front of the school bus when the bus is stopped and children are exiting the school bus. The safety arm portion 1412 may create a walking path that extends a distance outward from the front of the bus 100 to allow a bus driver to see children that are walking in front of the bus after disembarking. In some embodiments, the safety arm portion 1412 is five feet, causing children to walk at least five feet in front of the bus to give the bus driver an adequate visual field. In other embodiments, the safety arm portion 1412 may be longer than five feet.

In some embodiments, the safety device 1400 further includes a mounting motor (not shown but may be similar to other mounting motors disclosed herein, e.g., mounting motor 1204 illustrated in FIG. 30). The mounting bracket 1410 is coupled to the mounting motor such that the mounting motor moves the mounting bracket 1410, with attached housing bracket 1406 and the arm portion 1412, between a deployed (open or extended) position and an undeployed (closed) position. When in the undeployed position, the arm portion 1412 is adjacent to the front bumper of the school bus.

As shown clearly in FIG. 36, the mounting bracket 1410 includes a bottom ledge 1414 extending at a ninety-degree angle from a back wall 1416 of the mounting bracket 1410. The bottom ledge 1414 is configured for attaching to the housing bracket 1406. In some embodiments, the mounting bracket 1410 is metal, e.g., steel or aluminum. In yet some embodiments, at least some aspects of the mounting bracket 1410 are plastic or a polymer material that is transparent or translucent. In yet some other embodiments, at least some portions of the mounting bracket 1410 comprises a clear polycarbonate material.

The housing bracket 1406 is connected to the mounting bracket 1410 and is configured for receiving a portion of the safety arm 1412. The housing bracket 1406 includes a bottom portion 1420, a longitudinal side 1418, a first-short side 1422, and a second-short side 1424. The bottom portion 1420 of the housing bracket 1406 is fastened to the bottom ledge 1414 of the mounting bracket 1410. The bottom ledge 1414 of the mounting bracket 1410 includes a plurality of slots 1442 that are elongated as shown clearly in FIG. 37. The shape and position of the plurality of slots 1442 allow the safety device to conform to different bus bumper profiles. In some embodiments, the housing bracket 1406 and the mounting bracket 1410 may be fastened to each other using fasteners 1444, such a bolts or screws.

In some embodiments, the first-short side 1422 of the housing bracket 1406 has a first aperture 1426, and the second-short side 1424 of the housing bracket 1406 has a second aperture 1428. The first aperture 1426 is configured for receiving a first end 1430 of the safety arm 1412 and fastening the first end 1430 of the safety arm 1412 to the housing bracket 1406. The safety arm 1412 extends through the second aperture 1428 of the second-short side 1424 of the housing bracket 1406. The second aperture 1428 may provide support for a portion of the safety arm 1412. In yet some embodiments, the first aperture 1426 is smaller than the second aperture 1428.

The arm portion or safety arm 1412 includes the first or proximal end 1430 and a second or distal end (not explicitly shown but analogous to 1332). As previously discussed, the first end 1430 of the safety arm 1412 may be coupled to the first-short side 1422 of the housing bracket 1406. The safety arm 1412 extends the length of the housing bracket 1406, extending through the second aperture 1428 in the second-short side 1424 of the housing bracket 1406, with the second or distal end of the safety arm 1412 cantilevered from the housing bracket 1406.

In some embodiments, the safety arm 1412 has a longitudinal length that is greater than five feet. In some embodiments, the safety arm 1412 is at least partially formed from a transparent or translucent material. In yet some embodiments, the safety arm 1412 is comprised of fiberglass, aluminum, or polycarbonate.

The safety device 1400 may further include a plurality of lights 1436 coupled to the safety arm 1412. In some aspects, the plurality of lights 1436 are LED lights. In yet some aspects, the plurality of lights 1436 are LED lights that are wrapped around the safety arm 1412. The plurality of lights 1436 may be wrapped around seventy-five percent or more of a cantilevered length of the of the safety arm 1412 that extends outside of the housing bracket 1406.

The embodiments of FIGS. 35-37 may be applied or incorporated into any of the herein described safety devices.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A safety device for mounting to a pivoting stop sign on a school bus, the safety device comprising:
a mounting bracket for holding a portion of the pivoting stop sign, the mounting bracket having one or more mounting ears for attaching to the pivoting stop sign, the mounting bracket further having a bottom ledge, and wherein the mounting bracket is formed from a polymer material that is transparent or translucent;
a housing bracket fastened to the bottom ledge of the mounting bracket, the housing bracket for receiving a portion of a safety arm, wherein the housing bracket has a top portion, a first-longitudinal side, a second-longitudinal side, a first-short side, and a second-short side;
the safety arm having a first end and a second end;
wherein the first end of the safety arm is coupled to the housing bracket and the second end of the safety arm is cantilevered from the housing bracket, wherein the first end of the safety arm extends through the second-short side of the housing bracket and is fastened to the first-short side;
wherein the safety arm has a longitudinal length in the range of two feet to six feet;
wherein the safety arm is at least partially formed from a transparent or translucent material; and
a plurality of lights coupled to the safety arm.
2. The safety device of claim 1, wherein the plurality of lights are LED lights.
3. The safety device of claim 1, wherein the plurality of lights are wrapped around the safety arm.
4. The safety device of claim 1, wherein the mounting bracket further comprises one or more break-away slots beneath the mounting ears to allow a portion of the safety device to break-away upon impact.
5. The safety device of claim 1, wherein the first-short side of the housing bracket has a first aperture for receiving the first end of the safety arm, wherein the second-short side of the housing bracket has a second aperture for supporting a portion of the safety arm, wherein the first aperture is smaller than the second aperture.
6. The safety device of claim 1, further comprising reflective safety tape coupled to the safety arm along the longitudinal length of the safety arm.
7. The safety device of claim 1, wherein the safety arm comprises fiberglass.
8. The safety device of claim 1, wherein the mounting bracket comprises a clear polycarbonate material.
9. A safety device for mounting to a school bus, the safety device comprising:
a mounting bracket for attaching to at least a portion of the pivoting stop sign, the mounting bracket having one or more ears for attaching to the pivoting stop sign, the mounting bracket further having a bottom ledge;
a housing bracket for receiving a portion of a safety arm, wherein a top portion of the housing bracket is connected to the bottom ledge of the mounting bracket, wherein the housing bracket further includes a first-longitudinal side, a second-longitudinal side, a first-short side, and a second-short side;
wherein the safety arm includes a first end and a second end, wherein the first end of the safety arm extends through the second-short side of the housing bracket and is connected to the first-short side, and wherein the second side of the safety arm is cantilevered from the housing bracket; and a plurality of lights coupled to the arm.

10. The safety device of claim 9, wherein the mounting bracket is formed from a polymer material that is transparent or translucent.

11. The safety device of claim 9, wherein the safety arm is at least partially formed from a transparent or translucent material.

12. The safety device of claim 9, further comprising reflective safety tape coupled to the safety arm along a longitudinal length of the safety arm.

13. The safety device of claim 9, wherein the safety arm comprises fiberglass.

14. The safety device of claim 9, wherein the mounting bracket comprises a clear polycarbonate material.

15. The safety device of claim 9, wherein the mounting bracket further comprises one or more break-away slots beneath the mounting ears to allow a portion of the safety device to break-away upon impact.

16. The safety device of claim 9, wherein the plurality of lights coupled to the safety arm are LED lights wrapped around the safety arm.

17. The safety device of claim 9, wherein the first-short side of the housing bracket has a first aperture for receiving the first end of the safety arm, wherein the second-short side of the housing bracket has a second aperture for supporting a portion of the safety arm, wherein the first aperture is smaller than the second aperture.

18. A pivoting safety device for mounting to a school bus, the safety device comprising:

a first bracket for pivotally attaching to the school bus, wherein the first bracket is formed from a polymer material that is transparent or translucent;

a second bracket connected to the first bracket, the second bracket for receiving an arm;

the arm having a first end and a second end, wherein the first end is coupled to the second bracket, wherein the arm has a longitudinal length of at least five feet; and a plurality of lights coupled to the arm.

19. The safety device of claim 18, and wherein the arm is at least partially formed from a transparent or translucent material.

20. The safety device of claim 18, wherein the first bracket is attached to the front of the school bus.

* * * * *